(12) United States Patent
Rousseau et al.

(10) Patent No.: US 6,214,094 B1
(45) Date of Patent: Apr. 10, 2001

(54) ELECTRET FILTERS THAT EXHIBIT INCREASED OILY MIST RESISTANCE

(75) Inventors: Alan D. Rousseau, Stillwater; Marvin E. Jones, Grant; Betty Z. Mei, Woodbury, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/483,768

(22) Filed: Jan. 18, 2000

Related U.S. Application Data

(62) Division of application No. 08/941,270, filed on Oct. 1, 1997.

(51) Int. Cl.[7] .................................................. B03C 3/28
(52) U.S. Cl. ............................ 96/15; 55/524; 55/528; 55/DIG. 5; 55/DIG. 33; 55/DIG. 35; 55/DIG. 39; 96/69; 128/206.19; 442/82; 442/92
(58) Field of Search ............................ 96/15, 66, 69, 96/99; 95/57, 59; 442/82, 88, 92, 414; 128/206.19, 206.12, 205.29; 55/524, 528, DIG. 39, DIG. 5, DIG. 33, DIG. 35

(56) References Cited

U.S. PATENT DOCUMENTS

| | | |
|---|---|---|
| 3,959,421 | 5/1976 | Weber et al. ........................ 264/6 |
| 4,215,682 | 8/1980 | Kubik et al. .................. 55/DIG. 39 |
| 4,536,440 * | 8/1985 | Berg ................................ 55/524 X |
| 4,588,537 | 5/1986 | Klaase et al. ................ 264/DIG. 48 |
| 4,874,399 | 10/1989 | Reed et al. .................... 55/DIG. 39 |
| 4,931,230 * | 6/1990 | Krueger et al. ............ 264/211.13 X |
| 4,950,549 | 8/1990 | Rolando et al. ...................... 428/500 |
| 5,025,052 | 6/1991 | Crater et al. ......................... 524/104 |
| 5,057,710 | 10/1991 | Nishiura et al. ..................... 307/400 |
| 5,099,026 | 3/1992 | Howells et al. ...................... 548/229 |
| 5,256,176 * | 10/1993 | Matsuura et al. ...................... 55/528 |
| 5,411,576 * | 5/1995 | Jones et al. .............................. 95/57 |
| 5,472,481 | 12/1995 | Jones et al. .............................. 96/15 |
| 5,496,507 | 3/1996 | Angadjivand et al. ......... 55/DIG. 39 |
| 5,525,397 | 6/1996 | Shizuno et al. ...................... 428/138 |
| 5,645,627 * | 7/1997 | Lifshutz et al. .......................... 96/15 |
| 5,726,107 | 3/1998 | Dahringer et al. .............. 55/DIG. 39 |
| 5,780,153 | 7/1998 | Chou et al. . |
| 5,908,598 * | 6/1999 | Rousseau et al. .................... 264/344 |
| 5,919,847 | 7/1999 | Rousseau et al. ...................... 524/89 |
| 5,935,303 * | 8/1999 | Kimura ................................... 96/69 |
| 5,968,635 | 10/1999 | Rousseau et al. .................... 428/198 |
| 5,976,208 | 11/1999 | Rousseau et al. .............. 55/DIG. 39 |
| 6,002,017 | 12/1999 | Rousseau et al. .................... 548/451 |

FOREIGN PATENT DOCUMENTS

| | | |
|---|---|---|
| 0 447 166 A2 | 9/1991 | (EP) . |
| 0 616 831 A1 | 9/1994 | (EP) . |
| 0 705 931 A1 | 8/1995 | (EP) . |
| WO 97/07272 | 2/1997 | (WO) . |

OTHER PUBLICATIONS

Lavergne, C. and Lacabanne, C., "A Review of Thermo--Stimulated Current," *IEEE Electrical Insulation Magizine*, Mar./Apr. 1993, vol. 9, No. 2, pp. 5–21.
Touilhet, Yves, Dr., "Index 81 Congress Papers," May 5–7, 1981, Section 3—Advances in Web Forming, pp. 2–18.
Charge Density vs. Poling Time (undated).
TSDC Data For Corona Charged Web With Fluorochemical Additive That Has Been Aged (undated).

* cited by examiner

*Primary Examiner*—Richard L. Chiesa
(74) *Attorney, Agent, or Firm*—Frank S. Rosenberg; Karl G. Hanson

(57) ABSTRACT

The thermally stimulated discharge current of an electret article can be used to identify electret articles that exhibit superior filtration properties. Electret filters that exhibit superior properties not achieved in similarly constructed filters contain fibers that are made from a blend of a polymer and a performance-enhancing additive. The electret filters exhibit an initial detectable DOP penetration of less than 5% and an average Min@Chl of greater than 200 mg DOP as measured by DOP Filter Web Loading Test Procedure 1. These new electrets are particularly useful in a respirator.

19 Claims, 13 Drawing Sheets

ELECTRET FILTERS THAT EXHIBIT INCREASED OILY MIST RESISTANCE

This is a division of application Ser. No. 08/941,270 filed Oct. 1, 1997.

TECHNICAL FIELD

This invention pertains to electret articles, electret filters, respirators that employ electret filters, and the use of electret filters in removing particles from a gas, especially removing aerosols from air. This invention is especially concerned with electret filters that have improved properties such as electret stability in the presence of oily mists (i.e., liquid aerosols).

BACKGROUND

Scientists and engineers have long sought to improve filtration performance of air filters. Some of the most effective air filters use electret articles. Electret articles exhibit a persistent or quasi-permanent electrical charge. See G. M. Sessler, Electrets, Springer Verlag, N.Y., 1987. Researchers have expended considerable efforts to improve the properties of electret articles for use in filters. Despite extensive research directed toward producing improved electret articles, the effects of processing variables are not well understood, and, in general, the effects of varying processing conditions are difficult if not impossible to predict.

Electret articles have special property requirements such as charge stability, loading performance, resistance to moisture and oil exposure, et cetera, that can be significantly affected by processing steps that would be generally innocuous or beneficial for nonwoven fabrics and fabric-like materials. Thus, in the absence of extensive empirical data, it is often very difficult to understand the effects that a particular processing step (for example quenching) might or might not have on the resulting product's electret properties.

One method that has been reported to improve electret filter performance is blending a performance-enhancing additive into a polymer that is used to form electret fibers. For example, Jones et al. in U.S. Pat. Nos. 5,411,576 and 5,472,481 disclose electret filters that are made by extruding a blend of polymer and a melt-processable fluorochemical to form a microfibrous web that is subsequently annealed and corona treated. Lifshutz et al. in WO 96/26783 (corresponding to U.S. Pat. No. 5,645,627) report electret filters that are made by extruding a blend of polymer and a fatty acid amide or a fluorochemical oxazolidinone fluorochemical to form a microfibrous web that is subsequently annealed and corona treated.

Other techniques have been reported which improve an electret article's charge properties. For example, Klaase et al. in U.S. Pat. No. 4,588,537 report using corona treatment to inject charge into an electret filter. Angadjivand et al. in U.S. Pat. No. 5,496,507 found that impinging water droplets onto a nonwoven microfiber web imparted a charge to the web, and Rousseau et al. in WO 97/07272 disclose electret filters that are made by extruding blends of a polymer and a fluorochemical or organic triazine compound to form a microfibrous web that is subsequently impinged with water droplets to impart charge and thereby improve the hydrocharged web's filtration performance.

Matsuura et al. in U.S. Pat. No. 5,256,176 disclose a process of making stable electrets by exposing an electret to alternating cycles of applying electric charges and subsequently heating the article. Matsuura et al. do not disclose electrets having additives that enhance oily mist loading performance.

SUMMARY OF THE INVENTION

This invention provides an electret article containing a polymer and a performance-enhancing additive (other ingredients may also be added as described below). The electret article can, for example, be in the form of a fiber or film, or it may be in the form of a nonwoven web, especially when used as a filter. The inventors discovered that low crystallinity compositions containing a polymer and a performance-enhancing additive are particularly valuable because they can be converted to electret filters that have superior properties. As described below, the low crystallinity compositions can be made by introducing a quenching step during processing.

Quenching reduces a material's order (e.g. crystallinity) as compared to the material's order without the quenching process. The quenching step occurs concurrently with or shortly after converting a molten material into a desired shape. Usually the material is shaped by being extruded through a die orifice and quenched (typically by applying a cooling fluid to the extrudate) immediately after it exits the orifice.

The invention also provides a unique electret article containing a polymer and a performance-enhancing additive that may be characterized by certain features in a Thermally Stimulated Discharge Current (TSDC) spectrum. Electret filters incorporating the electret articles exhibiting these unique TSDC spectral features can exhibit surprisingly superior filtration performance.

The invention includes articles that incorporate the electret articles, and also includes methods of removing particulate solid or liquid aerosol from a gas using the inventive electret articles.

The invention further provides electret filters that exhibit superior properties not achieved in similarly constructed filters that do not use the inventive electret articles. These filters contain fibers made from a blend of polymer and performance-enhancing additive and they exhibit superior dioctylphthalate (DOP) liquid aerosol loading performance. DOP liquid aerosol loading performance is defined in relation to particular tests in the Examples section. Preferred filters exhibit enhanced oily mist loading performance and decreased penetration of aerosols or particulates while at the same time exhibiting a small pressure drop across the filter.

The present invention can provide numerous advantages over known electret filters including enhanced oily mist aerosol loading performance, charge stability in the presence of liquid aerosol, and decreased penetration of aerosols or particulates with a small pressure drop across the filter.

Electret articles of the present invention may find use in numerous filtration applications, including respirators such as face masks, home and industrial air-conditioners, furnaces, air cleaners, vacuum cleaners, medical and air line filters, and air cleaning systems in vehicles and in electronic equipment such as computers and disk drives.

DETAILED DESCRIPTION OF PREFERRED EMBODIMENTS

Figure 1:
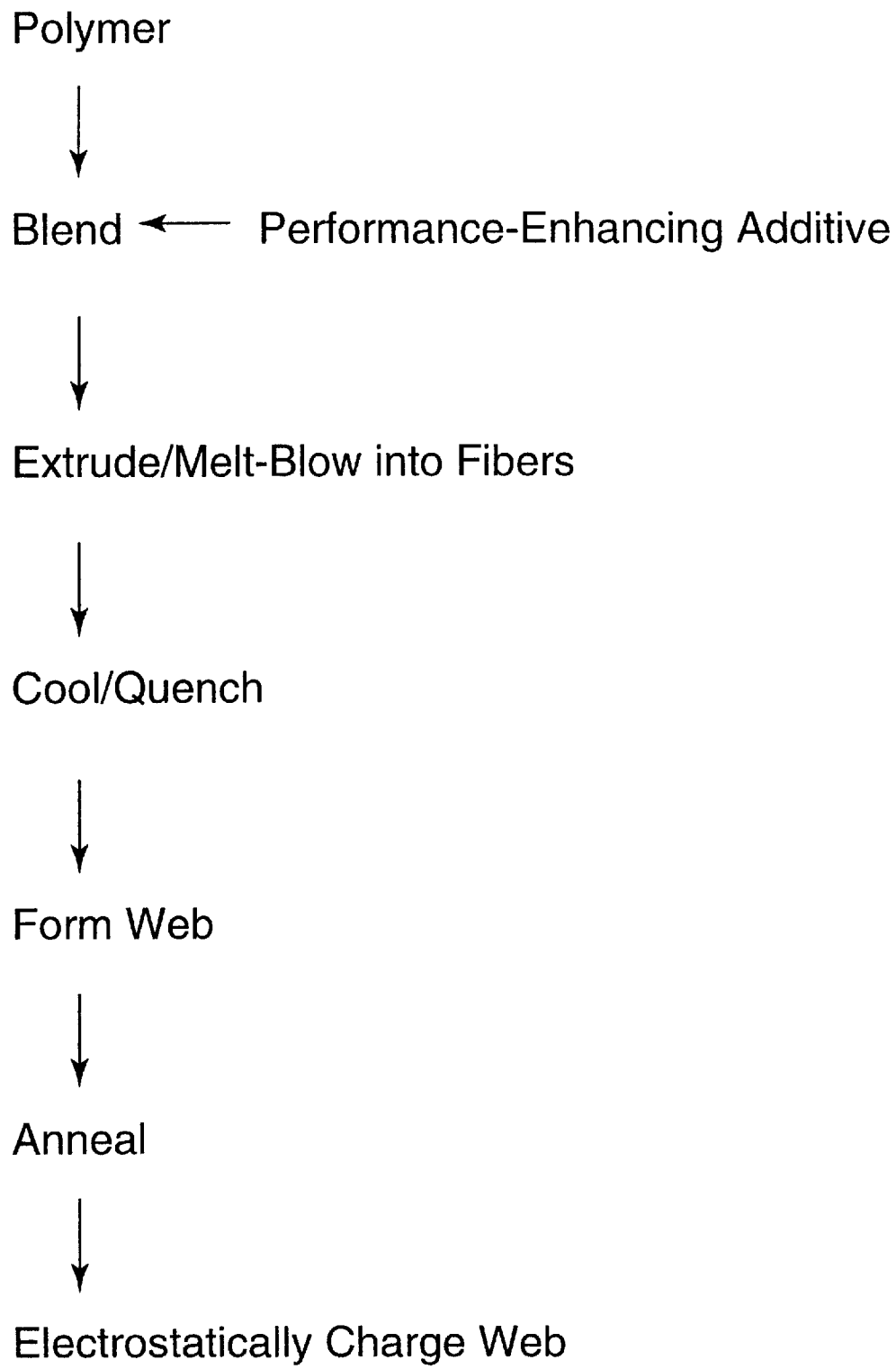
FIG. 1 is a flow chart illustrating a process for manufacturing electret filter media according to the invention.

Electret articles of the invention contain a polymer and a performance-enhancing additive. The polymer can be a nonconductive thermoplastic resin, that is, a resin having a resistivity greater than $10^{14}$ ohm·cm, more preferably $10^{16}$ ohm·cm. The polymer should have the capability of possessing a non-transitory or long-lived trapped charge. The polymer can be a homopolymer, copolymer or polymer blend. As reported by Klaase et al. in U.S. Pat. No. 4,588,537, preferred polymers include polypropylene, poly(4-methyl-1-pentene), linear low density polyethylene, polystyrene, polycarbonate and polyester. The major component of the polymer is preferably polypropylene because of polypropylene's high resistivity, ability to form melt-blown fibers with diameters useful for air filtration, satisfactory charge stability, hydrophobicity, and resistance to humidity. On the other hand, polypropylene is not typically oleophobic. The electret articles of the invention preferably contain about 90 to 99.8 weight percent polymer; more preferably about 95 to 99.5 weight percent; and most preferably about 98 to 99 weight percent, based on the weight of the article.

Performance-enhancing additives, as defined in the present invention, are those additives that enhance the oily aerosol filtering ability of the electret article after it has been formed into an electret filter. Oily aerosol filtering ability is measured by the DOP loading tests described in the Examples section. Particular performance-enhancing additives include those described by Jones et al., U.S. Pat. No. 5,472,481 and Rousseau et al., WO 97/07272. The performance-enhancing additives include fluorochemical additives such as fluorochemical oxazolidinones as those described in U.S. Pat. No. 5,025,052 (Crater et al.), fluorochemical piperazines and stearate esters of perfluoroalcohols. In view of their demonstrated efficacy in improving electret properties, the performance-enhancing additive is preferably a fluorochemical, more preferably a fluorochemical oxazolidinone. Preferably the fluorochemical has a melting point above the melting point of the polymer and below the extrusion temperature. For processing considerations, when using polypropylene, the fluorochemicals preferably have a melting point above 160° C. and more preferably a melting point of 160° C. to 290° C. Particularly preferred fluorochemical additives include Additives A, B and C of U.S. Pat. No. 5,411,576 having the respective structures,

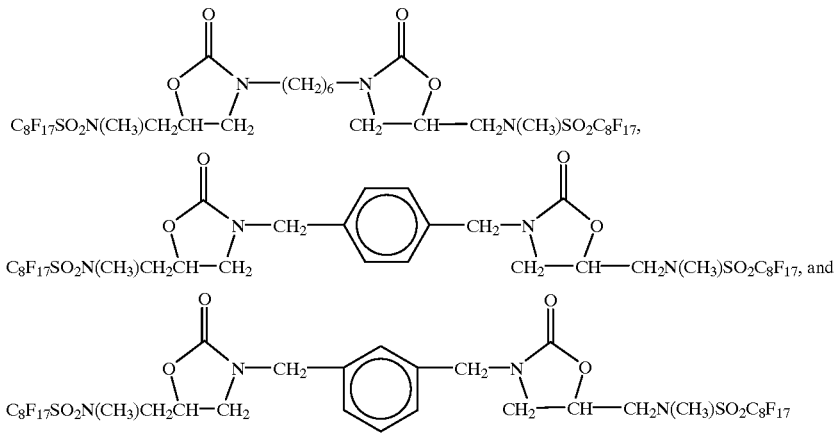

The electret article of the invention preferably contains about 0.2 to 10 weight percent performance-enhancing additive; more preferably about 0.5 to 5.0 weight percent; and most preferably about 1.0 to 2.0 weight percent, based on the weight of the article.

The polymer and performance-enhancing additive can be blended as solids before melting them, but the components are preferably melted separately and blended together as liquids. Alternatively, the fluorochemical additive and a portion of the polymer can be mixed as solids and melted to form a relatively fluorochemical-rich molten blend that is subsequently combined with the nonfluorochemical-containing polymer.

The molten blend is then shaped into a desired form such as a film or fiber. Typically the molten blend is shaped by extruding through a die, but in less preferred embodiments the blend can be shaped by alternative processes such as drawing in an electrostatic field (see, for example, Y. Trouilhet, "New Method of Manufacturing Nonwovens By Electrostatic Laying," in Index 81 Congress Papers, Advances In Web Forming, European Disposables And Nonwovens Association, Amsterdam, May 5–7, 1981. A preferred extrusion process uses two extruders, in this process about 10 to about 20 weight percent fluorochemical additive and about 80 to about 90 weight percent polymer are blended in a first extruder and this relatively high fluorochemical-content molten blend is fed into a second extruder with molten polymer (not containing a fluorochemical) to form a blend that is extruded through a die orifice. The high fluorochemical-content molten blend is preferably combined with the non-fluorochemical-containing polymer just before extruding the molten material through a die. This minimizes the time that the fluorochemical is exposed to high temperature. The temperature during extrusion should be controlled to provide desired extrudate rheology and avoid thermal degradation of the fluorochemical. Different extruders typically require different temperature profiles, and some experimentation may be required to optimize extrusion conditions for a particular system. For the polypropylene/fluorochemical blend the temperature during extrusion is preferably maintained below about 290° C. to reduce thermal degradation of the fluorochemical. If extruders are used, they are preferably of the twin screw type for better mixing, and they can be commercially available extruders such as Werner & Pfleiderer or Berstorff extruders.

The molten blend is preferably extruded through a die, and more preferably the blend is extruded through a die under melt-blowing conditions. Melt-blowing is known to offer numerous advantages, especially producing nonwoven webs, and articles of the invention can be made using melt-blowing processes and apparatuses that are well known in the art. Fiber melt-blowing was initially described by Van Wente, ".Superfine Thermoplastic Fibers," *Ind. Eng. Chem.*, vol. 48, pp. 1342–46, (1956). In general, the melt-blowing in the present invention is conducted using conventional procedures with the modification that the material is quenched (cooled) as it exits the die.

Suitable quenching techniques include water spraying, spraying with a volatile liquid, or contacting with chilled air or cryogenic gases such as carbon dioxide or nitrogen. Typically the cooling fluid (liquid or gas) is sprayed from nozzles located within about 5 centimeters (cm) of the die orifices. In the case of materials extruded through a die, the cooling fluid impacts the molten extrudate immediately after it is extruded from the die (and well before material is collected). For example, in the case of melt-blown fibers, the molten extrudate must be quenched before being collected in the form of a nonwoven web. The cooling fluid is preferably water. The water can be tap water but is preferably distilled or deionized water.

The object of the quenching step is to minimize the polymer crystallization in the resulting article. The inventors discovered that electret filters made from quenched materials exhibit unexpectedly good liquid aerosol filtration performance when subsequently annealed and charged. The quenching step reduces the polymer's crystalline content as compared to unquenched polymer extruded under the same conditions. The quenched material preferably has a low degree of crystallinity as determined by x-ray diffraction. Preferably, the polymer in the quenched material has a crystallinity index less than 0.3, more preferably less than 0.25, still more preferably less than 0.2, and still more preferably less than 0.1, as measured by the ratio of crystalline peak intensity to total scattered intensity over the 6 to 36 degree scattering angle range. Thus, a preferred intermediate composition for making an electret filter is made by blending and extruding a mixture of 90 to 99.8 weight percent organic polymer and 0.2 to 10 weight percent of a performance-enhancing additive; wherein the material is extruded through a die under meltblowing conditions to form fibers that are collected as a nonwoven web. The fibers are quenched, before being collected, by a cooling process such as water spraying, spraying with a volatile liquid, or contacting with chilled air or cryogenic gases such as carbon dioxide or nitrogen.

After quenching, the material is collected. If the material is in the form of fibers, it can be collected, cut and carded into a nonwoven web. Melt-blown fibers typically can be collected as a nonwoven web on a rotating drum or moving belt. Preferably the quenching and collection steps are conducted such that there is no excess quenching fluid (if there is a residual fluid it is typically water) remaining on the collected material. Fluid remaining on the collected material may cause problems with storage and requires additional heating during annealing to drive off the quenching fluid. Thus, collected material preferably contains less than 1 weight percent quenching fluid, and more preferably contains no residual quenching fluid.

The quenched material is annealed to increase electrostatic charge stability in the presence of oily mists. Preferably, the performance-enhancing additive is a substance that presents low energy surfaces such as a fluorochemical, and the annealing step is conducted at a sufficient temperature and for a sufficient time to cause the additive to diffuse to the interfaces (e.g., the polymer-air interface, and the boundary between crystalline and amorphous phases) of the material. Generally, higher annealing temperatures allow shorter times. To obtain desirable properties for the final product, annealing of polypropylene materials should be conducted above about 100° C. Preferably, annealing is conducted from about 130 to 155° C. for about 2 to 20 minutes; more preferably from about 140 to 150° C. for about 2 to 10 minutes; and still more preferably about 150° C. for about 4.5 minutes. Annealing should be conducted under conditions that do not substantially degrade the structure of the web. For polypropylene webs, annealing temperatures substantially above about 155° C. may be undesirable because the material can be damaged.

Webs that have not been annealed generally do not exhibit acceptable oily mist loading performance. Unannealed webs typically exhibit a Min@Chl of zero. The inventors hypothesize that the improved performance of the annealed webs may be due to an increase in interfacial area and/or an increase in the number of stable charge trapping sites. Thus alternative methods of increasing interfacial area can be used in place of annealing.

Annealing increases the crystallinity of polymer in the material. Annealing is also known to increase the stiffness and brittleness of the material and to decrease elongation, softness and tear resistance. Nonetheless, the decrease in softness and tear resistance is irrelevant since the goal of the invention is to improve electret filter performance.

With or without quenching, the annealing step is typically a rate limiting step in making liquid aerosol resistant electret filter webs. In one embodiment, the web is formed in a melt-blowing process at a rate of about 0.5 to 1.4 lbs./hr/inch of die.

The inventive method further includes the step of electrostatically charging the material after it has been quenched. Examples of electrostatic charging methods useful in the invention include those described in U.S. Pat. Nos. Re. 30,782 (van Turnhout), Re. 31,285 (van Turnhout), U.S. Pat. No. 5,401,446 (Tsai, et al.), U.S. Pat. No. 4,375,718 (Wadsworth et al.), U.S. Pat. No. 4,588,537 (Klaase et al.), and U.S. Pat. No. 4,592,815 (Nakao). The electret materials may also be hydrocharged (see U.S. Pat. No. 5,496,507 to Angadjivand et al.). Cut fibers can be tribocharged by rubbing or by shaking with dissimilar fibers (see U.S. Pat. No. 4,798,850 to Brown et al.). Preferably, the charging process involves subjecting the material to a corona discharge or pulsed high voltage as disclosed in some of the aforementioned patents.

The fibers can be of a sheath-core configuration and, if so, the sheath must contain the performance-enhancing additive as described in the blends discussed above. Preferably, the extrudate is in the form of microfibers having an effective diameter of about 5 to 30 micrometers ($\mu$m), preferably about 6 to 10 $\mu$m as calculated according to the method set forth in Davies, C.N., "The Separation of Airborne Dust and Particulates," Inst. of Mech. Eng., London, Proceedings 1B, 1952.

Electret articles of the invention can be characterized by TSDC studies. In TSDC a sample is placed between two electrodes, heated at a constant rate, and current discharged from the sample is measured by an ammeter. TSDC is a well known technique. See, for example, U.S. Pat. No. 5,256,176, Lavergne et al. "A Review of Thermo-Stimulated Current," IEEE Electrical Insulation Magazine, vol. 9, no. 2, 5–21, 1993, and Chen et al. "Analysis of Thermally Stimulated Processes," Pergamon Press, 1981. The current discharged from the sample is a function of the polarizability and charge trapping of the article being tested. Charged articles can be tested directly. Alternatively, charged and uncharged articles can be first poled in an electric field at an elevated temperature and then rapidly cooled below the glass transition temperature ($T_g$) of the polymer with the polarizing field on to "freeze in" the induced polarization. The sample is then heated at a constant rate and the resulting discharged current is measured. In the polarization process, charge injection, dipole alignment, charge redistribution or some combination of these may occur.

During a thermally stimulated discharge, charges stored in an electret become mobile and are neutralized either at the electrodes or in the bulk sample by recombination with charges of opposite sign. This generates an external current that shows a number of peaks when recorded as a function of temperature which is plotted on a graph (termed a TSDC spectrum). The shape and location of these peaks depends on charge trapping energy levels and physical location of trapping sites.

As indicated by many researchers (see, for example, Sessler, ed., "Electrets," Springer-Verlag, 1987 and Van Turnhout, "Thermally Stimulated Discharge of Polymer Electrets," Elsevier Scientific Publishing Co., 1975), electret charges are usually stored in structural anomalies, such as impurities, defects of the monomeric units, chain irregularities et cetera. The width of a TSDC peak is influenced by the distribution of charge trapping levels in the electrets. In semicrystalline polymers, often charges will either accumulate or be depleted near the amorphous-crystalline interfaces due to the difference in conductivity of the phases (the Maxwell-Wagner effect). These trapping sites are usually associated with different trapping energies where a continuous distribution of activation energies will be expected and the TSDC peaks expected to overlap and merge into a broad peak.

In a series of TSDC measurements described in the Examples section, it has been surprisingly discovered that various features in the TSDC spectrum correlate with superior oily mist loading performance. The TSDC spectral features correlating with superior performance include the features discussed below as preferred embodiments.

In one preferred embodiment, an intermediate composition for making an electret filter, the composition comprising a nonwoven web of fibers having a charge density of at least about 10 microcolombs per meter squared ($\mu C/m^2$) when tested according to TSDC Test Procedure 1 (as set forth in the Examples section).

In another preferred embodiment an electret article has a TSDC spectrum exhibiting a peak at about 15° C. to 30° C., more preferably about 15° C. to 25° C., below the melting temperature of the article, as measured by TSDC Test Procedure 2. When the polymer is polypropylene, the TSDC exhibits a peak at about 130 to 140° C.

In yet another preferred embodiment, an electret article having a TSDC spectrum exhibiting a peak having a width at half height of less than about 30° C., more preferably a width at half height of less than about 25° C., and still more preferably a width at half height of less than about 20° C., as measured by TSDC Test Procedure 3. In cases where the polymer is polypropylene, the narrow peak described above has its maximum at about 138 to 142° C.

In another preferred embodiment an electret article exhibits increasing charge density over 1 to 5 minutes, and/or 5 to 10 minutes, of poling time, as measured by TSDC Test Procedure 4.

The electret article may be in the form of a fiber and a multitude of these fibers may be formed into an electret filter. An electret filter can take the form of a nonwoven web containing at least some electret fibers combined with a supporting structure. In either case, the electret article can be combined with some nonelectret material. For example, the supporting structure can be nonelectret fibers or supporting nonelectret, nonwoven webs. The electret filter is preferably a nonwoven electret web containing electrically-charged, melt-blown microfibers.

The electret filter webs may also include staple fibers that provide a loftier, less dense web. Methods of incorporating staple fibers in the nonwoven web can be carried out as described U.S. Pat. No. 4,118,531 to Hauser. If staple fibers are used, the web preferably contains less than 90 weight percent staple fibers, more preferably less than 70 weight percent. For reasons of simplicity and optimizing performance, the electret web may in some instances consist essentially of melt-blown fibers and does not contain staple fibers.

The electret filter may further contain sorbent particulates such as alumina or activated carbon. The particulates may be added to the filter to assist in removing gaseous contaminants from an airstream that passes through the filter. Such particulate loaded webs are described, for example, in U.S. Pat. Nos. 3,971,373 to Braun, U.S. Pat. No. 4,100,324 to Anderson and U.S. Pat. No. 4,429,001 to Kolpin et al. If particulate material is added, the web preferably contains less than 80 volume percent particulate material, more preferably less than 60 volume percent. In embodiments where the electret filter does not need to remove gaseous contaminants, the filter may contain only melt-blown fibers.

The material used to form the electret filter is desirably substantially free of materials such as antistatic agents that could increase electrical conductivity or otherwise interfere with the ability of the article to accept and hold electrostatic charge. Additionally, the electret article should not be subjected to unnecessary treatments such as exposure to gamma rays, UV irradiation, pyrolysis, oxidation, etc., that might increase electrical conductivity. Thus, in a preferred embodiment the electret article is made and used without being exposed to gamma irradiation or other ionizing irradiation.

The electret filters made from melt blown fibers typically have a basis weight of about 10 to 500 grams per meter squared (g/m$^2$), more preferably about 10 to 100 g/m$^2$. Filters that are too dense may be difficult to charge while those that are too light or too thin may be fragile or have insufficient filtering ability. For many applications the electret filters are about 0.25 to 20 millimeters (mm) thick, and commonly about 0.5 to 2 mm thick. Electret filters of these basis weights and thicknesses may be particularly useful in a respirator.

Filters of the invention preferably exhibit an initial DOP penetration of less than 5% and an average Min@Chl of greater than 200 mg DOP, more preferably greater than 400 mg DOP, as measured by DOP Filter Web Loading Test Procedure 1 as described in the Examples section. "Average" as is it used in the Tables and Examples is the mean of measurements made from 4 to 6 samples cut from equally spaced parts across the filter web's entire width. For any other set of samples, average is defined as the mean Min@Chl value of an appropriate number of samples that are selected and load tested using the "t test" as described in Devore, "Probability and Statistics for Engineering and the Sciences," Brooks/Cole Publishing Co. (1987) to determine a statistically significant average within one standard deviation.

Superior filtration performance is achieved by preferred inventive filters in which each filter taken separately without averaging (hereinafter, simply termed "each filter") exhibits a Min@Chl of greater than 500 mg DOP, more preferably greater than about 600, and still more preferably about 800 to 1000 mg DOP. These filters preferably exhibit a pressure drop less than 13 mm H$_2$O, more preferably less than 10 mm H$_2$O, and still more preferably less than 8 mm H$_2$O, as measured by the method of Loading Test Procedure 1 as described in the Examples section.

DOP penetration is typically measured on an instrument known as an Automated Filter Tester (AFT). An initializing period is required for the DOP aerosol to reach the filter and for the electronics in the AFT to settle. The initial DOP penetration refers to the % DOP penetrating the web during the initial exposure, usually 6 to 40 seconds, while the testing apparatus is equilibrating. The initial DOP penetration is the first reading presented by the AFT using the built-in program. Filters of the present invention have at least a detectable penetration (i.e. a penetration above about 0.001% for the AFT instruments described in the Examples section).

In respirators, the fibrous electret webs may be specially shaped or housed, for example, in the form of molded or folded half-face masks, filter elements for replaceable cartridges or canisters, or prefilters.

Figure 10:
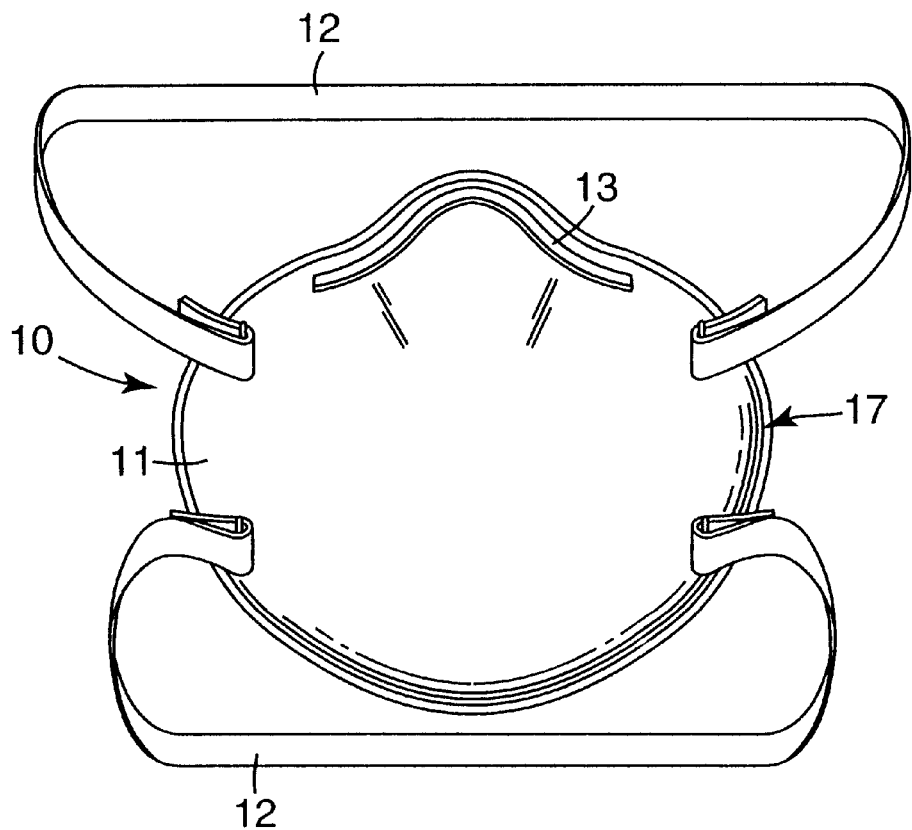
FIG. 10 shows a respirator or filtering face mask 10 incorporating an electret filter of the invention.
Figure 11:
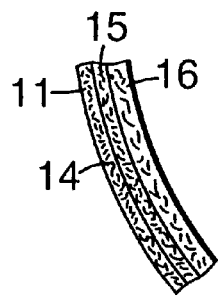
FIG. 11 shows a cross sectional view of the respirator body 17.

An example of a respirator 10 of the present invention is shown in FIGS. 10 and 11. The respirator's mask body 17 can be of curved, hemispherical shape or may take on other shapes as desired (see, e.g., U.S. Pat. Nos. 5,307,796 and 4,827,924). In respirator 10, the electret filter 15 is sandwiched between cover web 11 and inner shaping layer 16. Shaping layer 16 provides structure to the mask 10 and support for filtration layer 18. Shaping layer 16 may be located on the inside and/or outside of filtration layer 18 and can be made, for example, from a nonwoven web of thermally-bondable fibers molded into a cup-shaped configuration. The shaping layer can be molded in accordance with known procedures (see, e.g., U.S. Pat. No. 5,307,796). The shaping layer or layers typically are made of bicomponent fibers that have a core of a high melting material such as polyethylene terephthalate surrounded by a sheath of lower melting material so that when heated in a mold, the shaping layer conforms to the shape of the mold and retains this shape when cooled to room temperature. When pressed together with another layer, such as the filter layer, the low melting sheath material can also serve to bond the layers together. To hold the face mask snugly upon the wearer's face, mask body can have straps 12, tie strings, a mask harness, etc. attached thereto. A pliable soft band 13 of metal such as aluminum can be provided on mask body 17 to allow it to be shaped to hold the face mask in a desired fitting relationship on the nose of the wearer (see, e.g., U.S. Pat. No. 5,558,089). Respirators may also have additional features such as additional layers, valves (see, e.g., U.S. Pat. No. 5,509,436), molded face pieces, etc. Examples of respirators that can incorporate the improved electret filters of the present invention include those described in U.S. Pat. Nos. 4,536,440, 4,827,924, 5,325,892, 4,807,619 4,886,058 and U.S. patent application Ser. No. 08/079,234.

Respirators of this invention having a surface area of about 180 square centimeters ($cm^2$) preferably exhibit a Min@Chl of greater than 400 milligrams (mg) DOP, more preferably greater than 600 mg DOP, when tested using the National Institute for Occupational Safety and Health (NIOSH) Particulate Filter Penetration Procedure to Test Negative Pressure Respirators Against Liquid Particulates (Procedure APRS-STP-0051-00, Morgantown W. Va., NIOSH Division of Safety Research, May 31, 1995). The respirators preferably exhibit an initial DOP penetration of less than 5%. The respirators tested according to this Procedure preferably exhibit a pressure drop less than 13 mm $H_2O$, more preferably less than 10 mm $H_2O$, and still more preferably less than 8 mm $H_2O$. Larger surface area respirators are tested according to this standard by reducing the exposed surface area to 180 $cm^2$. Smaller respirators are tested according to this standard by adapting a holder for several respirators that has a total exposed area of about 180 $cm^2$.

Filter elements of this invention having a surface area of about 150 $cm^2$ preferably exhibit a Min@Chl of greater than 300 mg DOP, more preferably greater than 450 mg DOP, when tested using NIOSH Procedure APRS-STP-0051-00. Filters used as pairs on a respirator are tested using a single filter of the pair. The filters tested according to this Procedure preferably exhibit an initial DOP penetration of less than 5%. The filters preferably exhibit a pressure drop less than 13 mm $H_2O$, more preferably less than 10 mm $H_2O$, and still more preferably less than 8 mm $H_2O$.

Prefilters of this invention having a surface area of about 65 $cm^2$ preferably exhibit a Min@Chl of greater than 170 mg DOP, more preferably greater than 255 mg DOP, when tested using NIOSH Procedure APRS-STP-0051-00. Prefilters used as pairs on a respirator are tested using a single filter of the pair. The prefilters preferably exhibit an initial DOP penetration of less than 5%. The prefilters tested according to this Procedure preferably exhibit a pressure drop less than 17 mm $H_2O$, more preferably less than 14 mm $H_2O$, and still more preferably less than 12 mm $H_2O$.

EXAMPLES

General Sample Preparation and Testing

Extrusion of Webs

The following descriptions exemplify certain preferred embodiments of [methods of making] electret articles containing a polymer and a performance-enhancing additive. The articles in these examples are nonwoven filter webs made from a blend of polypropylene and a fluorochemical that is extruded under melt-blowing conditions and collected to form a blown microfiber (BMF) web. The fluorochemical melt additive was fed into the throat of a twin screw extruder along with polypropylene to produce a melt stream that contained about 11 weight percent fluorochemical. The bulk of the polypropylene was added to the throat of a second twin screw extruder. In some cases a peroxide was also metered in to reduce viscosity. The output of the fluorochemical-containing extruder was pumped into the polypropylene-containing extruder at a rate such as to make the total output about 1.1 percent by weight fluorochemical melt additive.

The temperature of the melt stream containing the fluorochemical melt additive was maintained below 290° C. at all points. The web itself was produced in a conventional manner similar to that described in Van Wente, et al. except that a drilled orifice die was used.

Quenching

Two quenching methods were used and are described below.

Method A

A spray bar containing thirteen individual Flat Fan Nozzles with UniJet Spray Nozzle Tips No. 9501 spaced four inches apart was mounted 0.75 inch from the die face and 2.5 inches below the molten polymer streams exiting the die. Each nozzle was rotated 10° from the cross web direction so that the fans of water droplets did not interfere with each other and the water pressure was set to the minimum level that would maintain a uniform spray.

Method B

A Sonic Spray System spray bar with 15 Model No. SDC 035 atomizing spray nozzles, available from Sonic Environmental Corp. of Pennsauken, N.J., was mounted approximately 7 inches below the center line and about one inch down stream of the die tip. The air pressure was set at 50 pounds per square inch (psi) and the water pressure was set at 30 psi. The water flow meters were, unless otherwise specified, adjusted so that each nozzle delivered 30 ml/min of water. Each nozzle delivered a cone of water droplets to the molten polymer streams exiting the die.

Annealing

The extruded webs were further treated by passing them through an oven heated to an average temperature of about 150° C. at a rate such that the dwell time in the oven was about 4.5 minutes. This annealing process causes additional crystallization of the polymer and causes the fluorochemical melt additive to diffuse to the interfaces of the fibers.

Charging

After annealing the webs were further treated by corona charging using a high voltage electric field provided between 30 linear cross-web corona sources and a ground electrode with a corona current of $2.6 \cdot 10^{-3}$ milliamps/cm of corona source length and a residence time of about 15 seconds.

Web Specifications

Web thickness was measured according to ASTM D1777-64 using a 230 g weight on a 10 cm diameter disk. Pressure drop can be measured according to ASTM F778. Basis weight was calculated from the weight of a 5.25 in. (13.3 cm) diameter disk.

DOP Loading Test

The dioctylphthalate (DOP) loading measurements were performed by monitoring the penetration of DOP aerosol through a sample during prolonged exposure to a controlled DOP aerosol. The measurements were made using an Automated Filter Tester (AFT) model #8110 or #8130 (available from TSI Incorporated, St. Paul, Minn.) adapted for DOP aerosol.

The DOP % Penetration is defined to be:

DOP % Penetration=100 (DOP Conc. Downstream/DOP Conc. Upstream), where the concentrations upstream and downstream were measured by light scattering and the DOP Percent Penetration was calculated automatically by the AFT. The DOP aerosol generated by the 8110 and 8130 AFT instruments was nominally a monodisperse 0.3 micrometers mass median diameter having an upstream concentration of 100 milligrams per cubic meter as measured by a standard filter. The samples tested were all tested with the aerosol ionizer turned off and at a flow rate through the filter web sample of 85 liters per minute (LPM).

DOP Filter Web Loading Test Procedure 1

The measurements were made using an AFT model #8110 adapted for DOP aerosol. The extruded web was cut into disks 6.75 inch (17.15 cm) in diameter. Two of the disks were stacked directly on top of each other, and the disks were mounted in a sample holder such that a 6.0 inch (15.2 cm) diameter circle was exposed to the aerosol. The face velocity was 7.77 centimeter per second (cm/sec).

The samples were weighed before inserting them into a sample holder. Each test was continued until there was a clear trend for increasing DOP Percent Penetration with continued DOP aerosol exposure or at least until an exposure to 200 milligrams of DOP. The DOP Percent Penetration and corresponding Pressure Drop data were transmitted to an attached computer where they were stored. After the termination of the DOP loading test, the loaded samples were weighed again to monitor the amount of DOP collected on the fibrous web samples. This served as a cross-check of the DOP exposure extrapolated from the measured DOP concentration incident on the fibrous web and the measured aerosol flow rate through the web.

The resulting loading data was imported into a spread sheet to calculate the minimum at challenge (Min@Chl). The Min@Chl is defined to be the total DOP challenge or mass of DOP which has been incident (i.e. the mass of DOP on and through the sample) on the filter web at the point where the DOP Percent Penetration reaches its minimum value. This Min@Chl is used to characterize the web performance against DOP loading, the higher the Min@Chl the better the DOP loading performance.

DOP Filter Web Loading Test Procedure 2

Procedure 2 was the same as 1 except that the samples were cut 5.25 inch (13.34 cm) in diameter and placed in the sample holder leaving a 4.5 inch (11.4 cm) diameter circle exposed, and the face velocity was 13.8 cm/sec.

In either procedure, the tests can be conducted using equivalent filter testers. One could also test single layers rather than double layers of filter web if the instantaneous filtration performance of the single layer is such that there is a pressure drop of 8 to 20 mm $H_2O$ and a detectable penetration less than 36% DOP penetration as measured with an exposed area of 102.6 $cm^2$ at a flow rate of 85 LPM using an AFT model no. TSI 8110 having the ionizer on. Either procedure includes the testing of smaller surface area filters by using a sample holder that would assemble a filter medium with an equivalent exposed area (i.e. 102.6 $cm^2$ for Procedure 2).

Determination of Polymer Crystallinity Index

Crystallinity data were collected by use of a Philips vertical x-ray diffractometer, copper Kα radiation and proportional detector registry of the scattered radiation. The diffractometer was fitted with variable entrance slits, fixed receiving slit, and diffracted beam monochromator. The X-ray generator was operated at settings of 45 kV and 35 mA. Step scans were conducted from 5 to 40 degrees (2θ) using a 0.05 degree step size and 5 second count time. Samples were mounted on aluminum holders using double coated tape with no backing plate or support used under web.

The observed scattering data were reduced to x-y pairs of scattering angle and intensity values and subjected to profile fitting using the data analysis software Origin™ (available from Microcal Software Inc., Northhampton Mass.). A gaussian peak shape model was employed to describe the six alpha-form polypropylene peaks and amorphous peak contributions. For some data sets, a single amorphous peak did not adequately account for the non-alpha form scattered intensity. In these cases, additional broad maxima were employed to fully account for the observed intensity. These broad inflections were primarily due to the mesomorphic form of polypropylene (for a discussion of mesomorphic polypropylene see Krueger et al., U.S. Pat. No. 4,931,230 and references cited therein). The scattering contribution due to the mesomorphic form of polypropylene was combined with the amorphous scatter. Crystallinity indices were calculated as the ratio of crystalline peak area to total scattered intensity (crystalline+amorphous) within the 6 to 36 degree (2θ) scattering angle range. A value of one represents 100 percent crystallinity and zero represents no crystallinity.

Thermally Stimulated Discharge Current (TSDC)

The TSDC studies were conducted using a Solomat TSCIRMA model 91000 with a pivot electrode, available from TherMold Partners, L.P., Thermal Analysis Instruments of Stanford, Conn. Web samples were cut and placed between electrodes in the Solomat TSC/RMA. In the Solomat instrument, a thermometer is disposed adjacent to, but not touching, the sample. The web samples should be optically dense, there should not be visible holes through the sample web. The samples should be large enough to completely cover the top contact electrode. Since the electrode is about 7 mm in diameter, the samples were cut larger than 7 mm in diameter. To ensure good electrical contact with the electrodes, the web samples are compressed about a factor of 10 in thickness. Air is evacuated from the sample chamber and replaced with helium at a pressure of about 1100. Liquid nitrogen cooling is used.

TSDC Test Procedure 1

An article is poled at 100° C. for 1 minute in an applied electric field of 2.5 kilovolts per minute (kV/mm) in the apparatus described above. With the field on, the sample is rapidly cooled (at the maximum rate of the instrument) to −50° C. The sample is held at −50° C. for 5 minutes with the field off, then heated at 3° C./min while the discharge current is measured. Charge densities can be calculated from each peak of the TSDC spectra by drawing a baseline between the minima on each side of a selected peak and integrating the area under the peak.

TSDC Test Procedure 2

The discharge current of an unpoled article is measured starting from 25° C. and heating at a rate of 3° C./min. Two samples from the article are tested identically except the samples are oriented in opposite directions when placed between the electrodes. The peak position(s) is measured for the article that was oriented to produce a positive discharge current at temperatures above about 110° C. (e.g., side B in FIG. 15).

The melting temperature of the article is determined by differential scanning calorimetry (DSC) conducted at a heating rate of 10° C./min, and defined as the peak maximum caused by melting that is observed in the second DSC heating cycle (i.e. the peak observed after heating to above the melting temperature, cooling to freeze the article and reheating).

TSDC Test Procedure 3

A sample is studied by the TSDC method of Procedure 2 to determine the correct orientation of the sample. The articles are then oriented in the Solomat TSC in the direction that produces a positive discharge current in the lower temperature peak in Procedure 2. Articles are then tested according to Procedure 1 except that each sample is poled at 100° C. for either 1, 5, 10 or 15 minutes. The value of peak width at half height of each peak is calculated by drawing a baseline, based on the curve slope from 0 to about 30° C., and measuring the peak width at half height.

TSDC Test Procedure 4

This procedure is identical to procedure 3 except that the charge density of the article at each poling time is calculated by drawing a baseline between the minima on each side of a selected peak, or if there is not a minima on the high temperature side of a peak, where the curve crosses or is extrapolated to cross zero current, and integrating the area under the peak.

Comparative Examples 1–3

Examples 1–3 demonstrate that improved loading performance can be achieved by annealing polymer and performance-enhancing additive containing compositions having a relatively low crystallinity index.

Example 1

A nonwoven filter web was prepared from Exxon Escorene 3505G, available from Exxon Chemical Company, and the fluorochemical

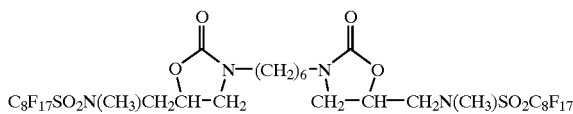

at a rate of 50 pounds per hour (lb/hr, 23 kilograms per hour (kg/hr)) and a melt temperature of 288° C. using a 48 inch (121.9 cm) drilled orifice die. The web had a basis weight of 71 grams per square meter, a thickness of 1.3 millimeters (mm) and a pressure drop of 6.6 mm $H_2O$ measured at a face velocity of 13.8 cm/s. After annealing and charging the web as described above, DOP load testing was performed on 5.25 inch (13.34 cm) diameter two-layer samples taken from six positions across the width of the web. The crystallinity index of the polypropylene was determined for samples cut from the same six positions of the web before (positions 1, 4 and 6) and after annealing (positions 1–6). The loading data (in Min@Ch1) and crystallinity indices for the six positions are given in Table 1, and unannealed crystallinity index vs. Min@Ch1 values for positions 1, 4 and 6 are plotted in FIG. 2.

TABLE 1

| Position | Cystallinity Index, Unannealed | Cystallinity Index, Annealed | Min @ Ch1 (mg) |
|---|---|---|---|
| 1 | 0.4 | 0.57 | 149 |
| 2 | — | 0.53 | 83 |
| 3 | — | 0.52 | 78 |
| 4 | 0.44 | 0.59 | 83 |
| 5 | — | 0.51 | 150 |
| 6 | 0.31 | 0.47 | 340 |

Figure 2:
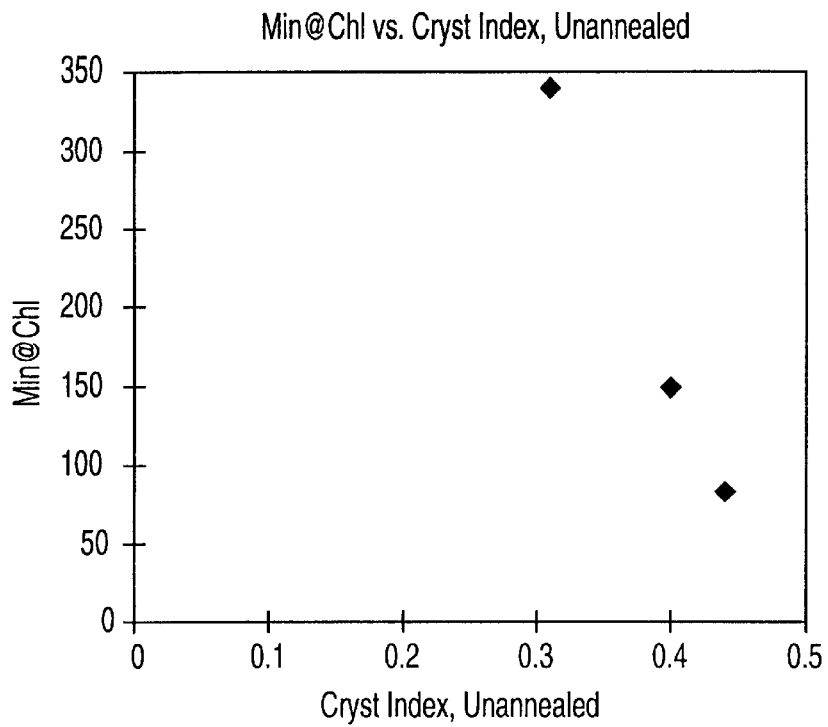
FIG. 2 shows a plot of the "minimum at challenge" (i.e. the mass, in milligrams (mg), of dioctylphthalate (DOP) which has been incident on a filter web at the point where the DOP Percent Penetration reaches a minimum value, hereinafter "Min@Chl") of samples cut from a nonquenched, annealed electret filter vs. the crystallinity index of the sample before annealing. As explained in detail in the Examples section, this data was obtained by exposing the filter webs to a DOP liquid aerosol in an instrument that measures the concentration of DOP liquid aerosol upstream and downstream to the filter. The Percent Penetration is calculated by dividing the aerosol concentration downstream by the concentration upstream and multiplying by 100.

As shown in the values in Table 1 for positions 1, 4 and 6 and the plot in FIG. 2, there is a correlation between the DOP loading performance (in Min@Ch1) and the crystallinity index of the web before annealing. The lower the crystallinity before annealing, the greater the value Min@Ch1. On the other hand, as shown in Table 1, there is not a correlation between the crystallinity index of the web after annealing and the DOP loading performance (in Min@Ch1).

Example 2

BMF web was prepared and treated as described in Example 1. The web had a basis weight of 74 grams per square meter, a thickness of 1.4 mm and a pressure drop of 7.0 mm $H_2O$ measured at a face velocity of 13.8 cm/s. The web was DOP load tested and analyzed for crystallinity index as in Example 1 and the resulting data are given in Table 2 and FIG. 3.

TABLE 2

| Position | Crystallinity Index, Unannealed | Crystallinity Index, Annealed | Min @ Ch1 (mg) |
|---|---|---|---|
| 1 | 0.34 | 0.64 | 182 |
| 2 | 0.36 | 0.66 | 166 |
| 3 | 0.45 | 0.66 | 87 |
| 4 | 0.45 | 0.64 | 59 |
| 5 | 0.43 | 0.67 | 117 |
| 6 | 0.44 | 0.67 | 178 |

Figure 3:
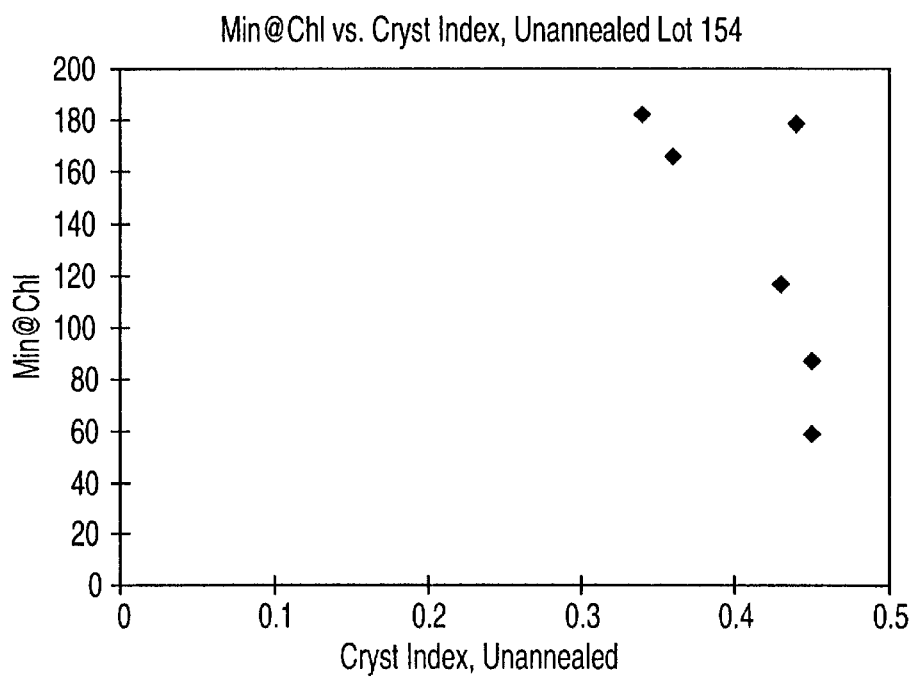
FIG. 3 shows a plot of the Min@Chl of samples cut from a nonquenched, annealed electret filter vs. the crystallinity index of the samples before annealing.

Again, the values in Table 2 and FIG. 3 show the general trend that lower crystallinity indices of the unannealed composition correlate with better loading performance while no correlation is observed for the annealed filters.

Example 3

BMF web was prepared and treated as described in Example 1 except that Fina 3860 polypropylene resin, available from Fina Oil and Chemical Company, was used and a peroxide concentrate containing 2,5-dimethyl-2,5-di (tert-butylperoxy)hexane was co-fed into the extruder to control the polypropylene's melt rheology and the physical parameters of the melt blown web. The web had a basis weight of 73 grams per square meter, a thickness of 1.4 mm and a pressure drop of 7.0 mm $H_2O$ measured at 85 liters per minute. The web was load tested and analyzed for crystallinity index as in Example 1 and the resulting data are presented in Table 3 and FIG. 4.

TABLE 3

| Position | Crystallinity Index, Unannealed | Crystallinity Index, Annealed | Min @ Ch1 (mg) |
|---|---|---|---|
| 1 | 0.38 | 0.52 | 66 |
| 2 | 0.42 | 0.54 | 49 |
| 3 | 0.44 | 0.54 | 62 |
| 4 | 0.39 | 0.53 | 45 |
| 5 | 0.33 | 0.53 | 119 |
| 6 | 0.32 | 0.53 | 98 |

Figure 4:
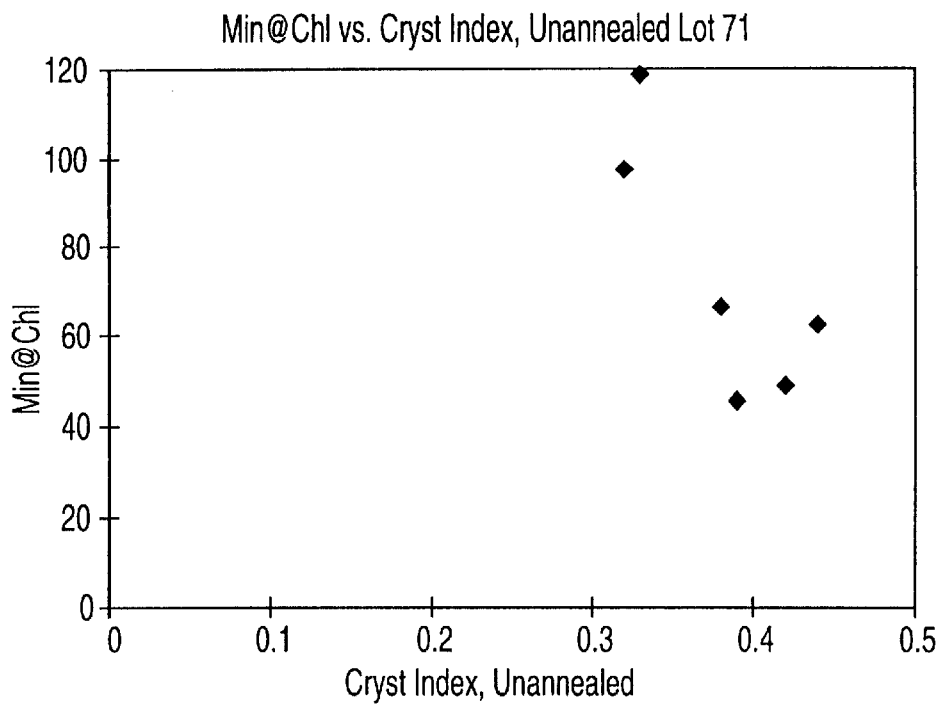
FIG. 4 shows a plot of the Min@Chl of samples cut from a nonquenched, annealed electret filter vs. the crystallinity index of the sample before annealing.

Again, the values in Table 3 and FIG. 4 show the general trend that lower crystallinity indices of the unannealed composition correlate with better loading performance while no correlation is observed for the annealed filters.

Examples 4–8

Examples 4–8 illustrate that quenching or low crystallinity of the unannealed fibers (i.e. the intermediate composition) correlate with superior oily mist loading properties of the annealed electret filter webs.

Example 4

Figure 5:
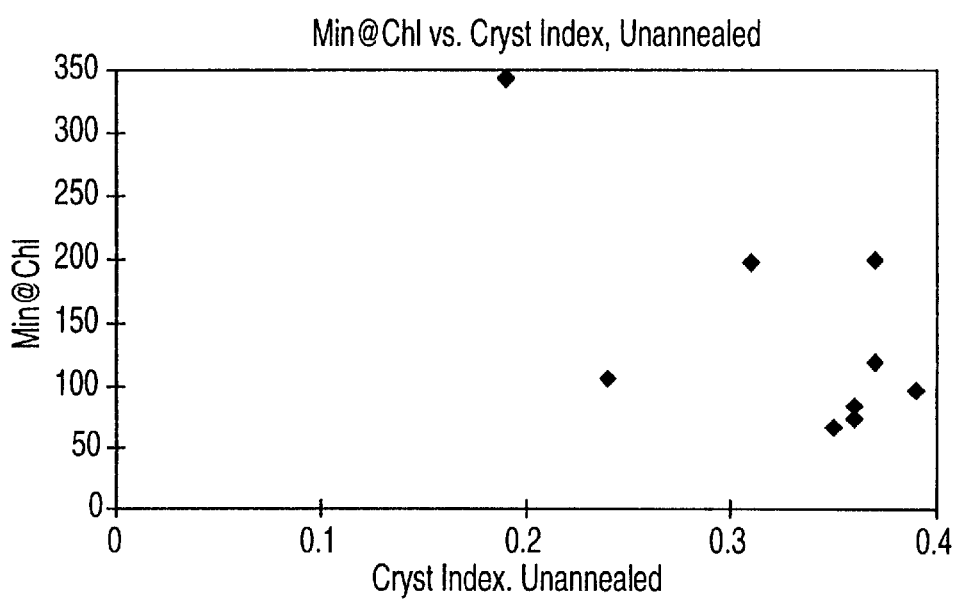
FIG. 5 shows a plot of the Min@Chl of samples cut from quenched and nonquenched, annealed electret filters vs. the crystallinity index of the samples before annealing.

BMF web was prepared and treated as in Example 1. The web had a basis weight of 69 grams per square meter, a thickness of 1.3 mm and a pressure drop of 6.2 mm $H_2O$ measured at a face velocity of 13.8 cm/s. After sufficient web was collected for further processing and testing, the extrudate was sprayed with water using Method A described above. Water purified by reverse osmosis and deionization was used. In this experiment the spray bar only spanned about ⅔ the width of the die. The collector was moved in from about 12 to about 8 inches to maintain the desired web parameters. The webs were DOP load tested and analyzed for crystallinity index as in Example 1, and the resulting data are given in Tables 4A and 4B and FIG. 5.

TABLE 4A

Without Quenching, Comparative Examples

| Position | Crystallinity Index, Unannealed | Crystallinity Index, Annealed | Min @ Ch1 (mg) |
|---|---|---|---|
| 1 | 0.36 | 0.62 | 84 |
| 2 | 0.39 | 0.6 | 97 |
| 3 | 0.36 | 0.63 | 73 |
| 4 | 0.35 | 0.63 | 67 |
| 5 | 0.37 | 0.62 | 119 |
| 6 | 0.37 | 0.64 | 200 |

TABLE 4B

With Quenching

| Position | Crystallinity Index, Unannealed | Crystallinity Index, Annealed | Min @ Ch1 (mg) |
|---|---|---|---|
| 1 | 0.31 | 0.61 | 198 |
| 2 | 0.19 | 0.6 | 344 |
| 3 | 0.24 | 0.6 | 106 |
| 4 | 0.19 | 0.6 | 343 |

The data in Tables 4A and 4B show that quenching reduces the crystallinity index of the extruded fibers. Annealing the low crystallinity index composition improves the loading performance of the annealed and charged filter web. The data further shows that annealing compositions having a crystallinity index below about 0.3 results in electret filters having superior loading performance. More particularly, annealing webs having a crystallinity index below about 0.3 results in filters having an average Min@Ch1 of greater than 200 mg while annealing webs having a crystallinity index above about 0.3 results in filters having an average Min@Ch1 of less than 200 mg.

Example 5

Figure 6:
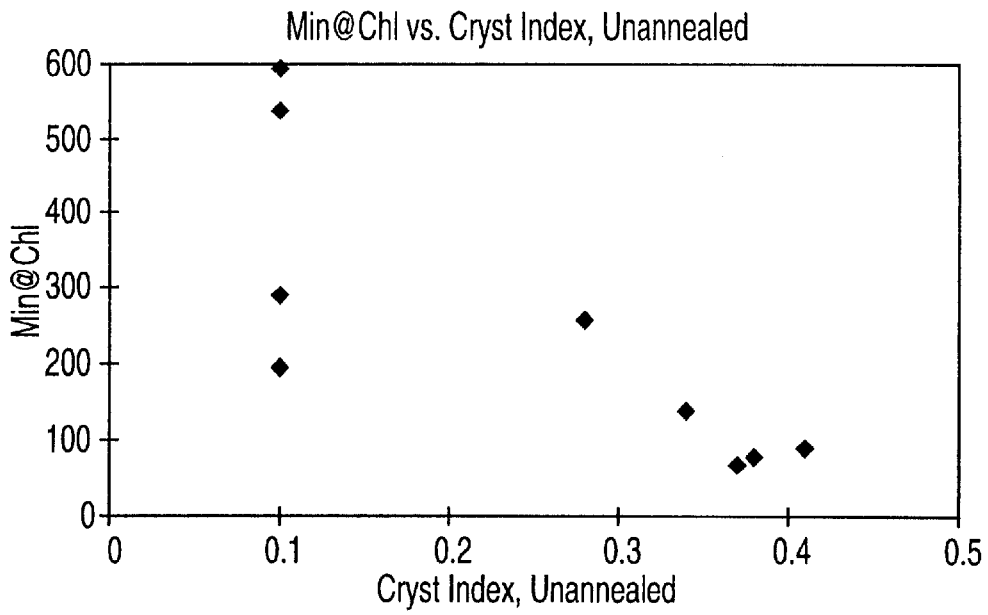
FIG. 6 shows a plot of the Min@Chl of samples cut from quenched and nonquenched, annealed electret filters vs. the crystallinity index of the samples before annealing.

BMF web was prepared and treated as in Example 1 except that the extrusion rate was 100 pounds per hour and peroxide was added as in Example 3 to control the melt rheology of the polypropylene and the physical parameters of the melt blown web. The web had a basis weight of 73 grams per square meter, a thickness of 1.3 mm and a pressure drop of 6.6 mm H$_2$O measured at a face velocity of 13.8 cm/s. After sufficient web was collected for further processing and testing (see examples in Table 5A) the extrudate was sprayed with water using Method B described above. The spray bar spanned the entire web which had a basis weight of 74 grams per square meter, a thickness of 1.3 mm and a pressure drop of 6.2 mm H$_2$O measured at 85 liters per minute. The collector was moved in from 12 to 11 inches to maintain web parameters. Unpurified tap water was used. The webs were DOP load tested and analyzed for crystallinity index as in Example 1 except that 6.75 inch (17.15 cm) circles were used for load testing and the resulting data are given in Tables 5A and 5B and FIG. 6.

TABLE 5A

Without Quenching, Comparative

| Position | Crystallinity Index, Unannealed | Crystallinity Index, Annealed | Min @ Ch1 (mg) |
|---|---|---|---|
| 1 | 0.37 | 0.63 | 68 |
| 2 | 0.38 | 0.64 | 78 |
| 3 | 0.41 | 0.64 | 90 |
| 4 | 0.38 | 0.62 | — |
| 5 | 0.34 | 0.62 | 139 |

TABLE 5B

With Quenching

| Position | Crystallinity Index, Unannealed | Crystallinity Index, Annealed | Min @ Ch1 (mg) |
|---|---|---|---|
| 1 | 0.1 | 0.63 | 539 |
| 2 | 0.1 | 0.58 | 194 |
| 3 | 0.1 | 0.61 | 289 |
| 4 | 0.1 | 0.61 | 595 |
| 5 | 0.28 | 0.62 | 256 |

As in Example 4 the data in Tables 5A and 5B show that quenching reduces the crystallinity index of the unannealed web and improves the loading performance of the annealed and charged web. The data further shows that annealing webs having a crystallinity index below about 0.3 results in filters having an average Min@Ch1 of greater than 200 mg while annealing webs having a crystallinity index above about 0.3 results in filters having an average Min@Ch1 of less than 200 mg. The data also show that lower crystallinity compositions, such as having a crystallinity index of about 0.1 can lead to further improved loading performance. For example, some electret filters can have a Min@Ch1 of greater than 500 mg.

Example 6

Figure 7:
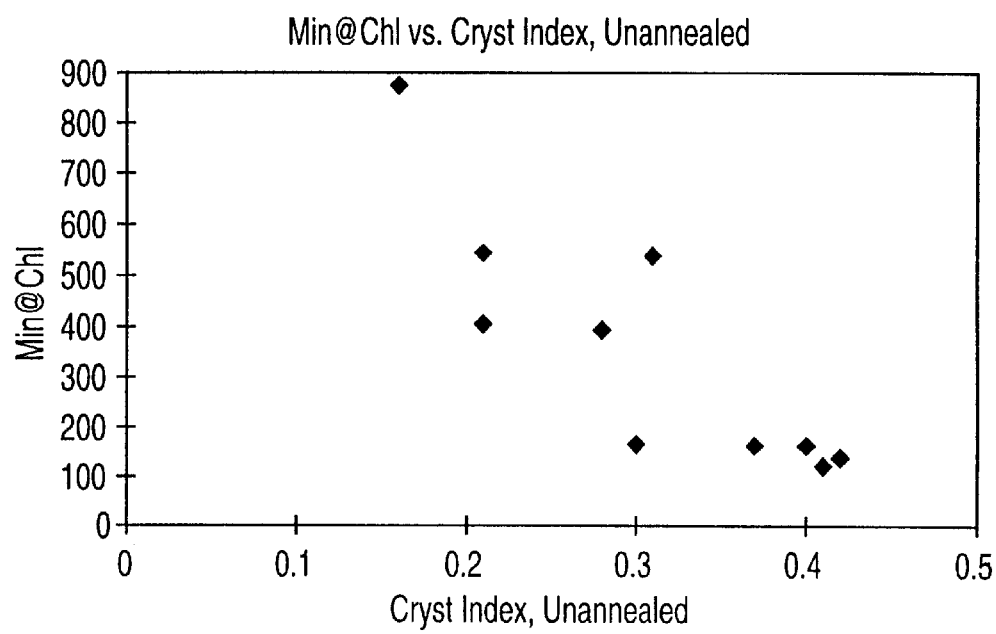
FIG. 7 shows a plot of the Min@Chl of samples cut from quenched and nonquenched, annealed electret filters vs. the crystallinity index of the samples before annealing.

BMF web was prepared and treated as described in Example 1. The web had a basis weight of 73 grams per square meter, a thickness of 1.3 mm and a pressure drop of 7.0 mm H$_2$O measured at a face velocity of 13.8 cm/s. After sufficient web was collected for further processing and testing the extrudate was sprayed with water as in Example 5 using Method B described above. The collector was moved in from 10 to 8.5 inches to maintain web parameters. The water sprayed web had a basis weight of 71 grams per square meter, a thickness of 1.4 mm and a pressure drop of 6.6 mm H$_2$O measured at 85 liters per minute. The webs were DOP load tested and analyzed for crystallinity index as in Example 5 and the resulting data are given in Tables 6A and 6B and FIG. 7.

TABLE 6A

Without Quenching, Comparative

| Position | Crystallinity Index, Unannealed | Crystallinity Index, Annealed | Min @ Ch1 (mg) |
|---|---|---|---|
| 1 | 0.42 | 0.62 | 139 |
| 2 | 0.41 | 0.63 | 121 |
| 3 | 0.4 | 0.62 | 162 |

TABLE 6A-continued

Without Quenching, Comparative

| Position | Crystallinity Index, Unannealed | Crystallinity Index, Annealed | Min @ Ch1 (mg) |
|---|---|---|---|
| 4 | 0.37 | 0.62 | 162 |
| 5 | 0.3 | 0.65 | 165 |

TABLE 6B

With Quenching

| Position | Crystallinity Index, Unannealed | Crystallinity Index, Annealed | Min @ Ch1 (mg) |
|---|---|---|---|
| 1 | 0.31 | 0.62 | 537 |
| 2 | 0.16 | 0.61 | 875 |
| 3 | 0.21 | 0.62 | 403 |
| 4 | 0.21 | 0.6 | 544 |
| 5 | 0.28 | 0.61 | 393 |

As in Examples 4–7, the data in Tables 6A and 6B show that quenching reduces the crystallinity index of the unannealed web and improves the loading performance of the annealed and charged web. The data further shows that annealing webs having a crystallinity index below about 0.3 results in filters having an average Min@Ch1 of greater than 200 mg while annealing webs having a crystallinity index above about 0.3 results in filters having an average Min@Ch1 of less than 200 mg. The data also show that some electret filters made from the quenched materials can have a Min@Ch1 of greater than 500 mg and some with a Min@Ch1 of greater than 800 mg.

Example 7

Figure 8:
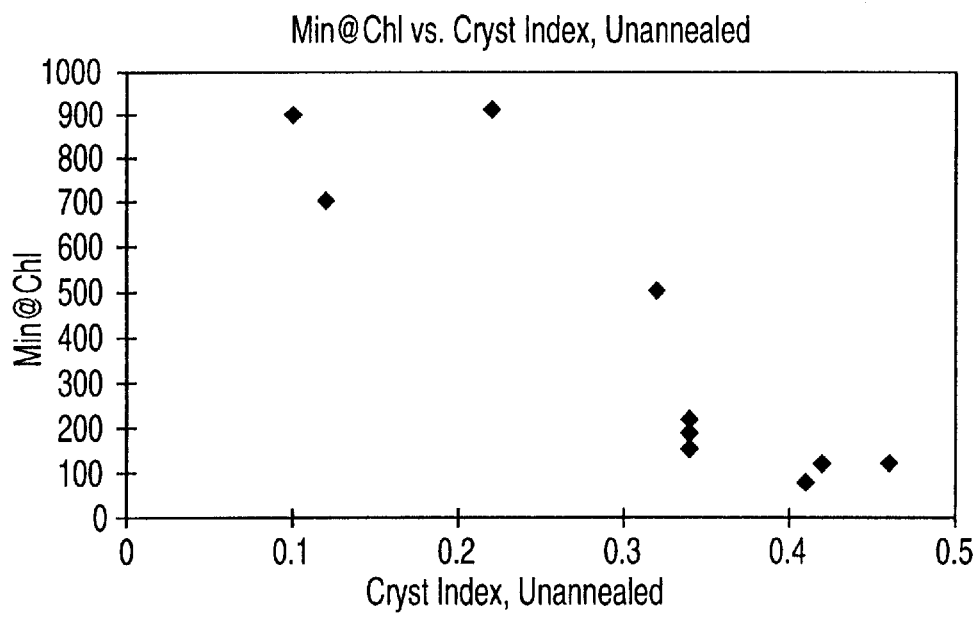
FIG. 8 shows a plot of the Min@Chl of samples cut from quenched and nonquenched, annealed electret filters vs. the crystallinity index of the samples before annealing.

BMF webs were made and treated as in Example 6 with and without water spray using Method B. For this example the water was purified by reverse osmosis and deionization. The web specifications were similar to those in Example 6. The webs were load tested and analyzed for crystallinity index as in Example 6 and the resulting data are given in Tables 7A and 7B and FIG. 8.

TABLE 7A

Without Water Spray

| Position | Crystallinity Index, Unannealed | Crystallinity Index, Annealed | Min @ Ch1 (mg) |
|---|---|---|---|
| 1 | 0.42 | 0.6 | 120 |
| 2 | 0.46 | 0.62 | 122 |
| 3 | 0.41 | 0.62 | 79 |
| 4 | 0.34 | 0.63 | 153 |
| 5 | 0.34 | 0.62 | 189 |

TABLE 7B

With Water Spray

| Position | Crystallinity Index, Unannealed | Crystallinity Index, Annealed | Min @ Ch1 (mg) |
|---|---|---|---|
| 1 | 0.32 | 0.62 | 502 |
| 2 | 0.1 | 0.59 | 899 |
| 3 | 0.12 | 0.61 | 702 |
| 4 | 0.22 | 0.61 | 911 |
| 5 | 0.34 | 0.6 | 219 |

As in Examples 4–6, the data in Tables 7A and 7B show that quenching reduces the crystallinity index of the unannealed web and improves the loading performance of the annealed and charged web. The data further shows that annealing webs having a crystallinity index below about 0.3 results in filters having an average Min@Ch1 of greater than 200 mg while annealing webs having a crystallinity index above about 0.3 results in filters having an average Min@Ch1 of less than 200 mg. The data also show that some electret filters made from the quenched materials can have a Min@Ch1 of greater than 500 mg and some with a Min@Ch1 of greater than 800 mg.

Example 8

Figure 9:
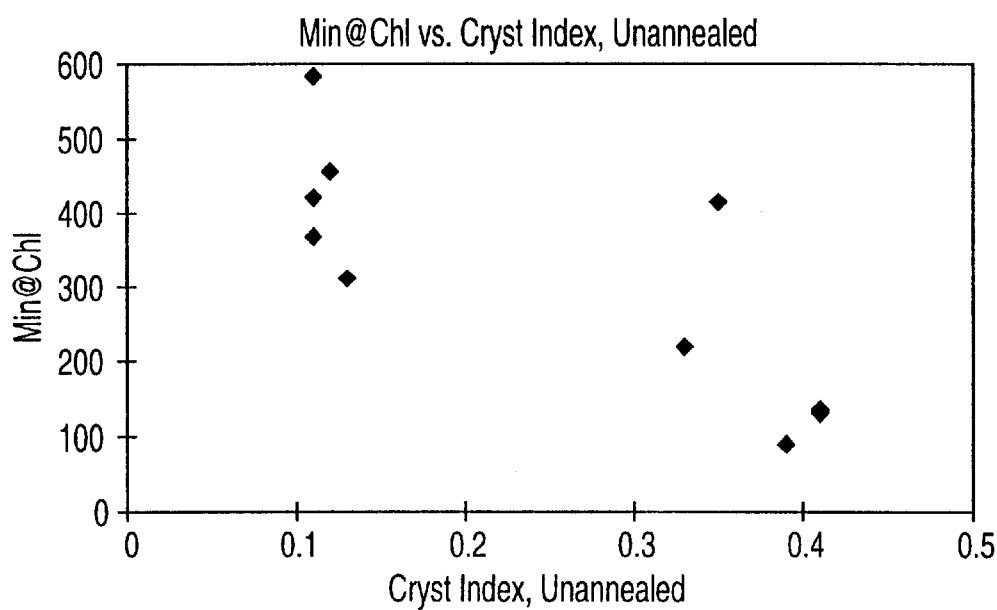
FIG. 9 shows a plot of the Min@Chl of samples cut from quenched and nonquenched, annealed electret filters vs. the crystallinity index of the samples before annealing.

BMF webs were made and treated as in Example 7 with and without water spray using Method B. The webs had web specifications similar to those in Example 7. The webs were load tested and analyzed for crystallinity index as in the previous examples and the resulting data are given in Tables 8A and 8B and FIG. 9.

TABLE 8A

Without Quenching, Comparative

| Position | Crystallinity Index, Unannealed | Crystallinity Index Annealed | Min @ Ch1 (mg) |
|---|---|---|---|
| 1 | 0.41 | 0.6 | 130 |
| 2 | 0.39 | 0.62 | 90 |
| 3 | 0.41 | 0.63 | 135 |
| 4 | 0.33 | 0.63 | 219 |
| 5 | 0.35 | 0.55 | 415 |

TABLE 8B

With Quenching

| Position | Crystallinity Index, Unannealed | Crystallinity Index Annealed | Min @ Ch1 (mg) |
|---|---|---|---|
| 1 | 0.11 | 0.55 | 421 |
| 2 | 0.13 | 0.55 | 312 |
| 3 | 0.11 | 0.55 | 368 |
| 4 | 0.11 | 0.55 | 583 |
| 5 | 0.12 | 0.55 | 456 |

As in Examples 4–7, the data in Tables 8A and 8B show that quenching reduces the crystallinity index of the unannealed web and improves the loading performance of the annealed and charged web. The data further shows that annealing webs having a crystallinity index below about 0.3 results in filters having an average Min@Ch1 of greater than 200 mg while annealing webs having a crystallinity index above about 0.3 results in filters having an average Min@Chl of less than 200 mg. The data also show that some electret filters made from the quenched materials can have a Min@Chl of greater than 500 mg.

Tables 9A and 9B show average Min@Chl data for Examples 4–8 for unquenched and quenched samples.

TABLE 9A

Averaged Min @ Ch1 Data (mg) - Unquenched, Comparative

| Example | Minimum Min @ Ch1 | Maximum Min @ Ch1 | Average Min @ Ch1 |
| --- | --- | --- | --- |
| 4 | 66 | 200 | 106 |
| 5 | 68 | 138 | 93 |
| 6 | 121 | 165 | 150 |
| 7 | 79 | 189 | 133 |
| 8 | 90 | 415 | 198 |

TABLE 9B

Averaged Min @ Ch1 Data (mg) - Quenched

| Example | Minimum Min @ Ch1 | Maximum Min @ Ch1 | Average Min @ Ch1 |
| --- | --- | --- | --- |
| 4 | 106 | 344 | 248 |
| 5 | 194 | 594 | 375 |
| 6 | 392 | 875 | 550 |
| 7 | 219 | 899 | 647 |
| 8 | 312 | 583 | 428 |

The averaged data in Tables 9A and 9B, combined with the crystallinity values shown in the previous Tables demonstrate that quenching can reduce the crystallinity index of the unannealed web below about 0.3 and further that annealing webs having a crystallinity index below about 0.3 results in filters having an average Min@Chl of greater than 200 mg while annealing webs having a crystallinity index above about 0.3 results in filters having an average Min@Chl of less than 200 mg.

Examples 9 and 10

Examples 9 and 10 show that the addition of a performance-enhancing additive causes a strong signal in the TSDC spectrum. A nonwoven web was prepared as described in Example 4 (including quenching). A second sample was prepared identically except without a performance-enhancing additive. Both web samples were studied by the method of TSDC Test Procedure 1. The sample containing the performance-enhancing additive showed a significant discharge peak at about 110° C. In comparison, the web without a performance-enhancing additive did not show a significant peak. This observation suggests that the discharge current generated by the sample containing the performance-enhancing additive is due to depolarization of the performance-enhancing additive upon heating. The performance-enhancing additive is believed to be polarized in the poling step.

Examples 11–15

Examples 11–15 show that quenched webs, after poling, have a higher charge density than unquenched webs. Sample webs a (quenched, unannealed) and c (quenched, annealed) were the same as those described in Example 4, position 4 (except without corona charging). Sample b (unquenched, unannealed) was the same as described in Example 2, position 4 (except without corona charging) and sample d (unquenched, annealed) was the same as described in Example 2, position 6 (except without corona charging). All web samples were studied by the method of TSDC Test Procedure 1.

Figure 12:
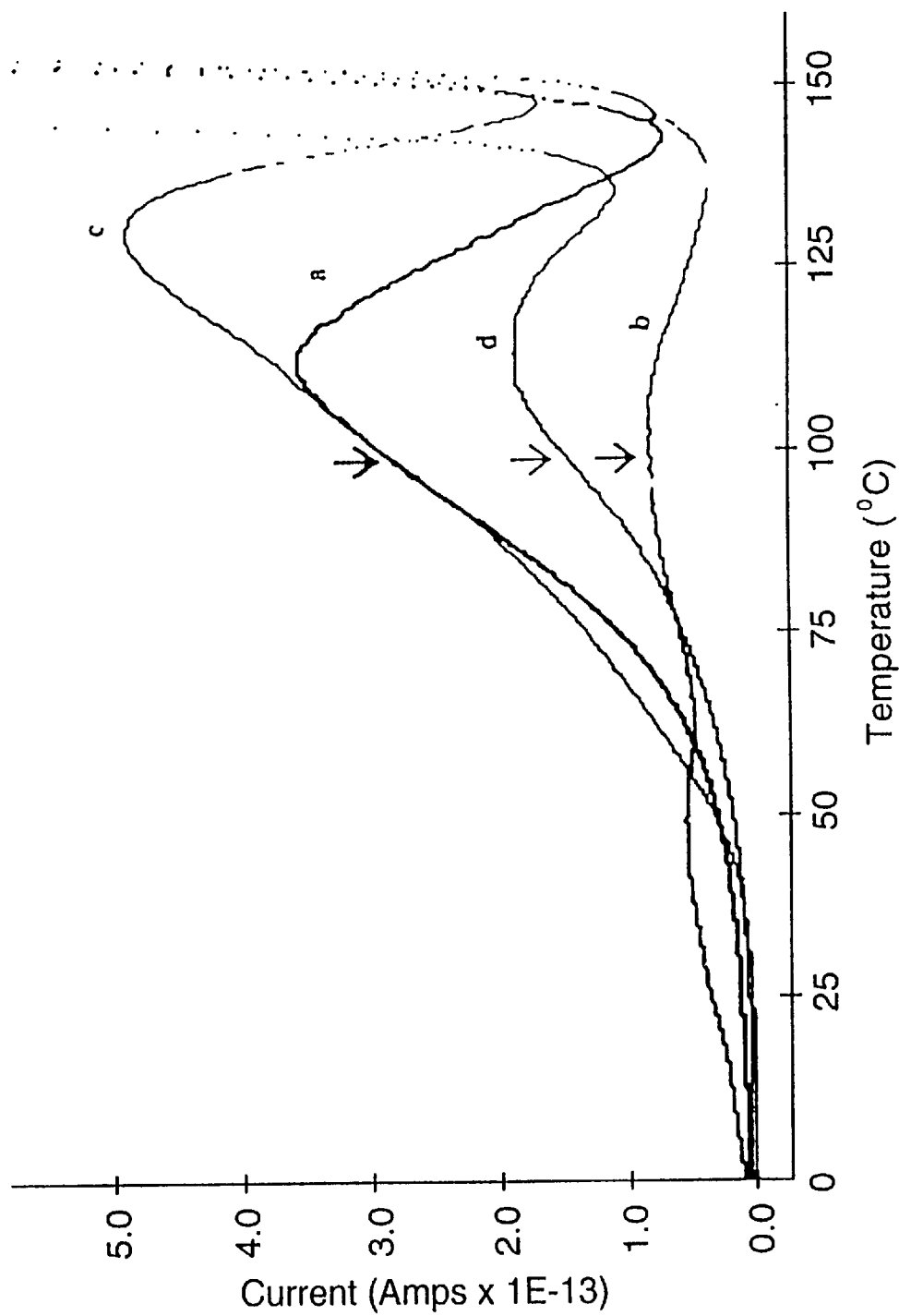
FIG. 12 shows a thermally stimulated discharge current (TSDC) spectrum of uncharged polymer and performance-enhancing additive containing webs that have been poled in an electric field of 2.5 kilovolts per millimeter (kV/mm) at 100° C. for 1 minute. The webs were produced using the following four processing conditions: a) quenched, unannealed, b) unquenched, unannealed, c) quenched, annealed, and d) unquenched, annealed.

The resulting TSDC spectra are shown in FIG. 12. Charge densities can be calculated from each peak of the TSDC spectra by drawing a baseline between the minima on each side of a selected peak and integrating the area under the peak. As illustrated in FIG. 12, TSDC spectra generally show a steeply increasing discharge current as the temperature approaches the melting point of the article tested.

Figure 13A:
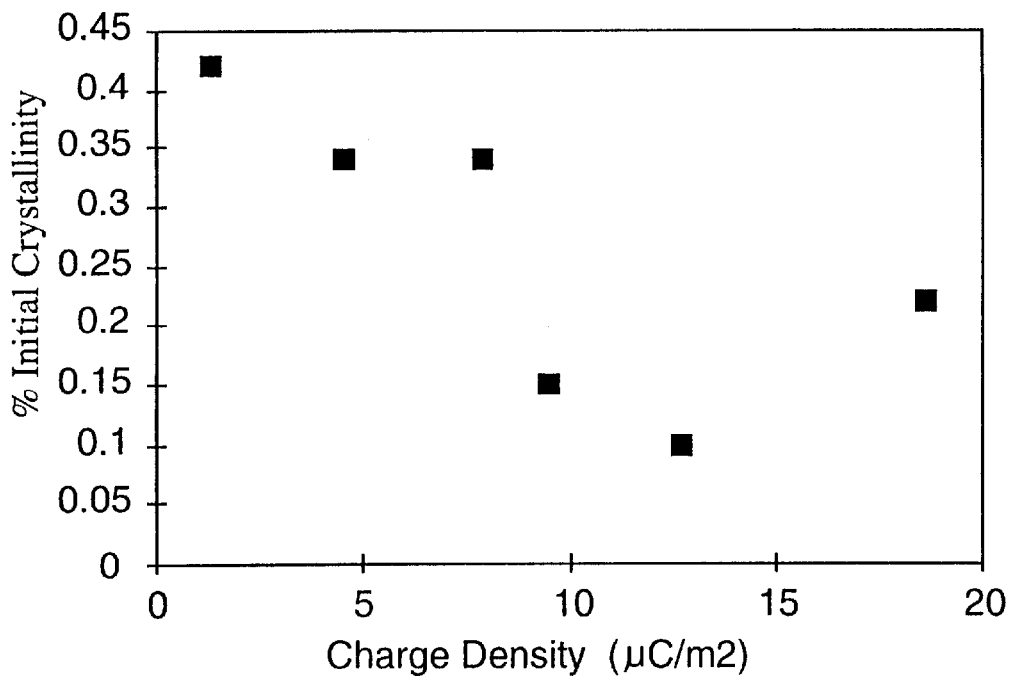
FIG. 13a shows a plot of the crystallinity index of 6 unannealed and uncharged polymer and performance-enhancing additive containing web samples vs. the charge density of the samples after annealing (without charging) that have been poled in an electric field of 2.5 kilovolts per millimeter (kV/mm) at 100° C. for 1 minute.

Multiple samples of uncharged and annealed webs as described in Example 7 were tested as described for Examples 11–15 for both unquenched (positions 2 and 6) and quenched (positions 3, 4, 5 and 6) webs. None of the unquenched webs had a charge density above 10 microcolombs per square meter ($\mu C/m^2$). Crystallinity indices of unannealed webs vs. charge density of the annealed, uncharged webs are plotted in FIG. 13a. FIG. 13a shows that unannealed webs having a relatively low crystallinity index generally have a higher charge density as determined by TSDC Test Procedure 1.

Figure 13B:
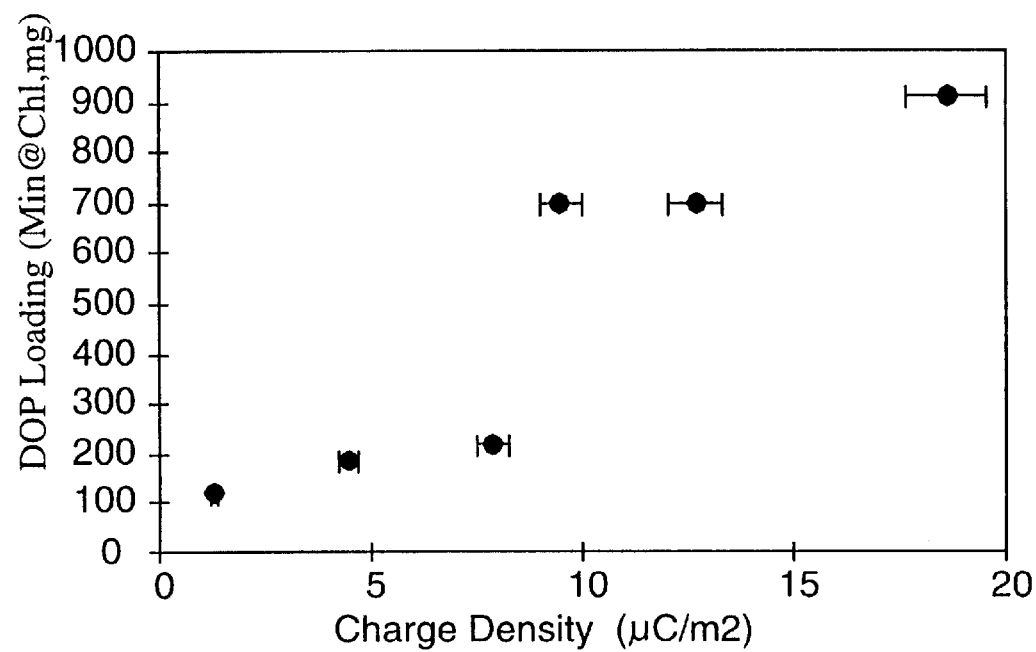
FIG. 13b shows a plot of the DOP loading performance (in Min@Chl) of 6 annealed and charged polymer and performance-enhancing additive containing web samples vs. charge density of the samples after annealing (without charging) that have been poled in an electric field of 2.5 kilovolts per millimeter (kV/mm) at 100° C. for 1 minute.

DOP loading performance (in Min@Chl) of the annealed and charged webs vs. charge density of the annealed, uncharged webs are plotted in FIG. 13b. FIG. 13b shows the quite surprising result that annealed, uncharged webs having a charge density value above about 10 $\mu C/m^2$, as measured by TSDC Test Procedure 1 also have superior DOP loading performance after charging.

Examples 17 and 18

Figure 14:
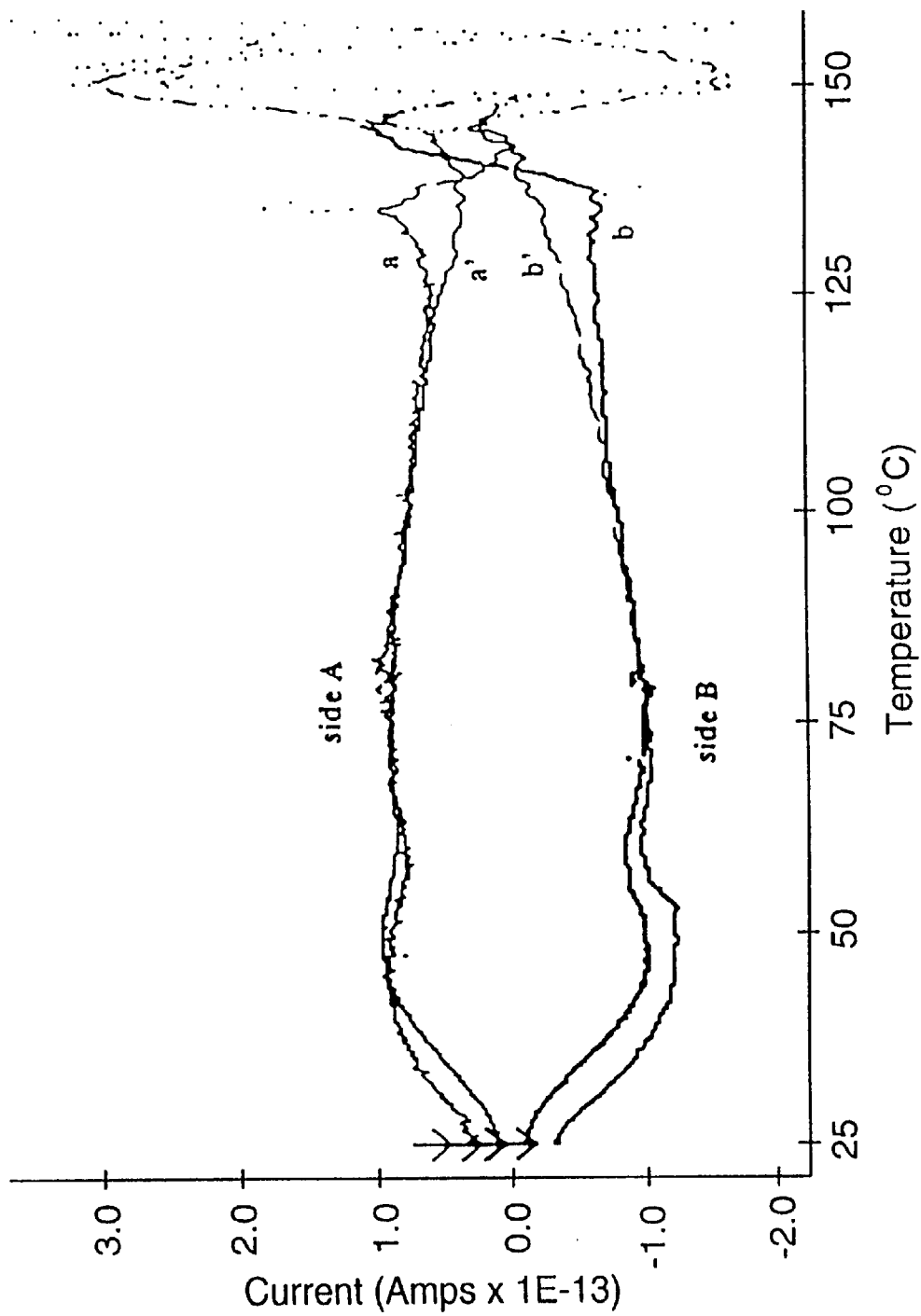
FIG. 14 shows TSDC spectra of annealed and corona charged, unpoled polymer without performance-enhancing additive containing webs. Samples a and b were quenched during processing while samples a' and b' were not quenched. Side A refers to the side of the web contacting the upper electrode when a positive current is discharged while side B refers to the opposite side of the web that, when contacting the upper electrode, discharges a negative current.

Examples 17 and 18 illustrate the TSDC spectra of quenched and unquenched annnealed, corona charged webs made without a performance-enhancing additive. Quenched (a, b) and unquenched (a', b') webs were prepared as described in Example 4 except that no fluorochemical additive was present in the webs. TSDC spectra of the unpoled webs were acquired using Test Procedure 2 and are shown in FIG. 14. The sign of the discharge current (either positive or negative) is a function of the web's orientation in the TSC instrument relative to the orientation during corona charging.

Examples 19 and 20

Figure 15:
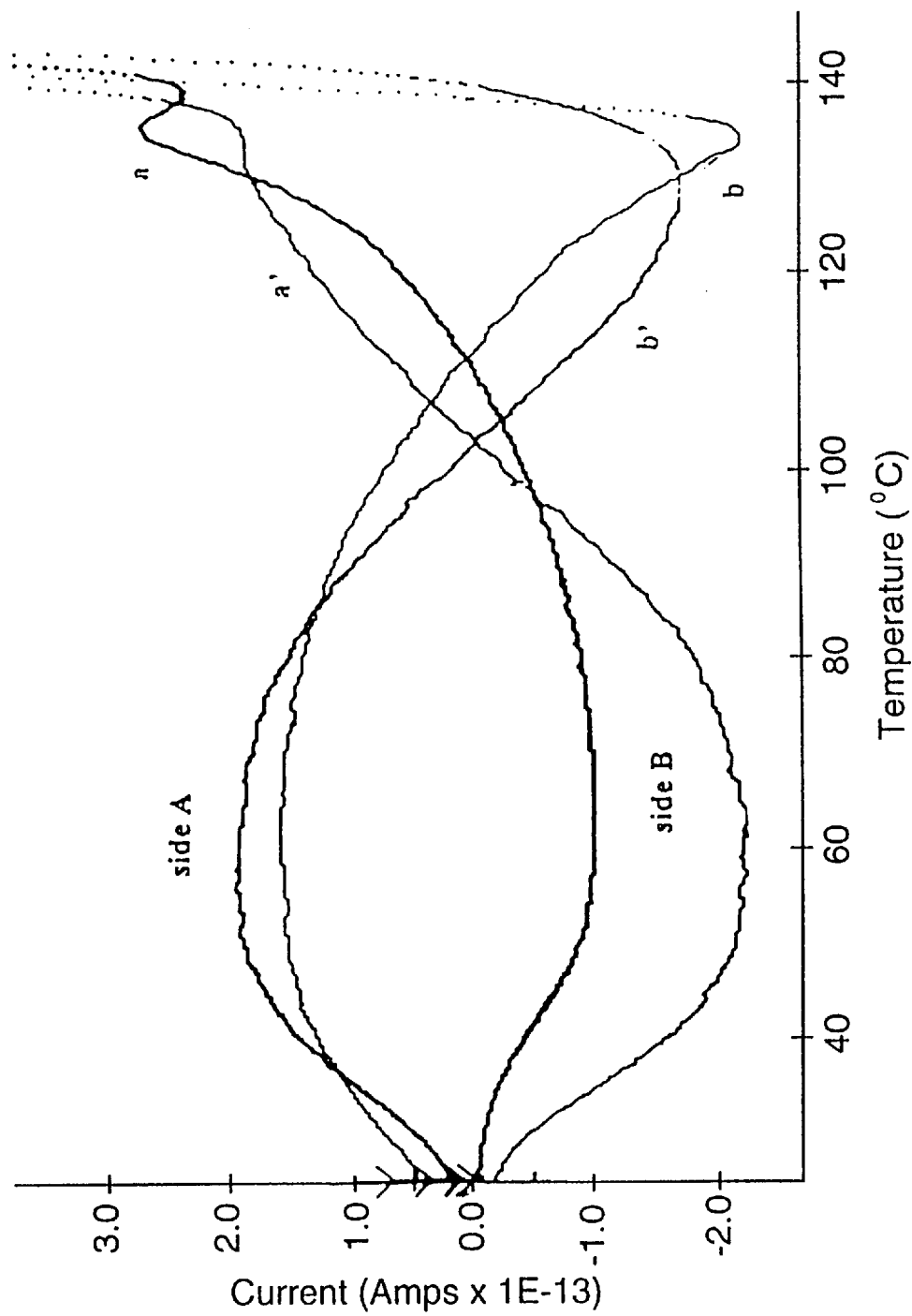
FIG. 15 shows TSDC spectra of annealed and corona charged, unpoled polymer and performance-enhancing additive containing webs. Samples a and b were quenched during processing while samples a' and b' were not quenched. Side A refers to the same side of the web as side A in FIG. 14 with respect to contact to the upper electrode, and side B refers to the opposite side of the web.

Examples 19 and 20 illustrate the TSDC spectra of quenched and unquenched annnealed, corona charged webs made from a polymer and performance-enhancing additive. Quenched (a, b) and unquenched (a', b') webs were prepared as described in Example 8, position 1. The webs were studied by TSDC as described in TSDC Test Procedure 2. The results of the TSDC study are shown in FIG. 15. As part of the test procedure, the melting point of the article being tested is determined by DSC, and in this case was found to be 159° C.

As shown in FIG. 15, when oriented to exhibit a positive discharge current above about 110° C., the spectrum of the quenched web, a, exhibits a relatively narrow peak centered at about 137° C. This spectrum indicates that quenching causes a narrowing of the energy distribution of charge trapping sites in the annealed and charged web. In comparison, the spectrum of the unquenched web, a', shows only a very broad peak centered at a significantly lower temperature (about 120° C.), indicating a relatively broad distribution of charge trapping site energy levels. Thus, inventive articles can exhibit the distinguishing characteristic of a current peak centered at about 15 to 30° C. below the melting point of the article when measured by TSDC Test Procedure 2.

As shown by the previously discussed DOP load testing results, webs made from quenched (or relatively low crystallinity) intermediates have greatly enhanced DOP loading performance as compared with webs made from unquenched (or relatively high crystallinity) intermediates. Thus, the inventors have surprisingly discovered a characteristic spectral feature (i.e., the current peak described above) that correlates with enhanced DOP loading performance.

Examples 20 and 21

Examples 20 and 21 show TSDC spectra of quenched (FIG. 16a) and unquenched (FIG. 16b) articles and illustrate spectral features that can characterize certain articles of the invention. These examples were the webs described in Example 8, position 3 (quenched and unquenched). TSDC studies were conducted as described in TSDC Test Procedure 3. The articles in FIG. 16a differ only in their poling times: a—1 minute, b—5 minutes, c—10 minutes, and d—15 minutes. Similarly, the articles in FIG. 16b differ only in their poling times: a'—1 minute, b'—5 minutes, c'—10 minutes, and d'—15 minutes.

Figure 16A:
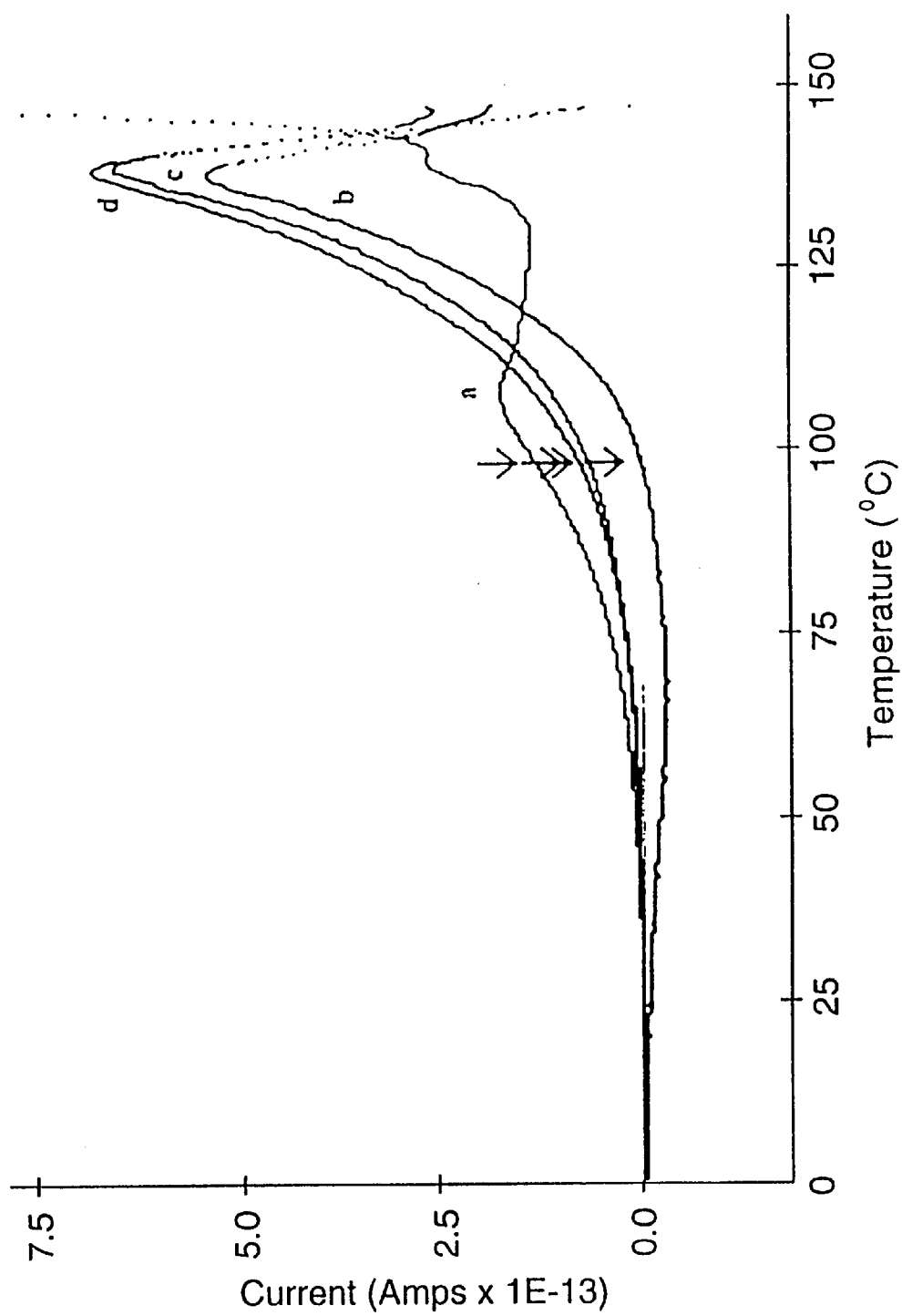
FIG. 16a shows TSDC spectra of annealed and corona charged, quenched polymer and performance-enhancing additive containing webs that have been poled in an electric field of 2.5 kV/mm at 100° C. for a) 1 minute, b) 5 minutes, c) 10 minutes and d) 15 minutes.
Figure 16B:
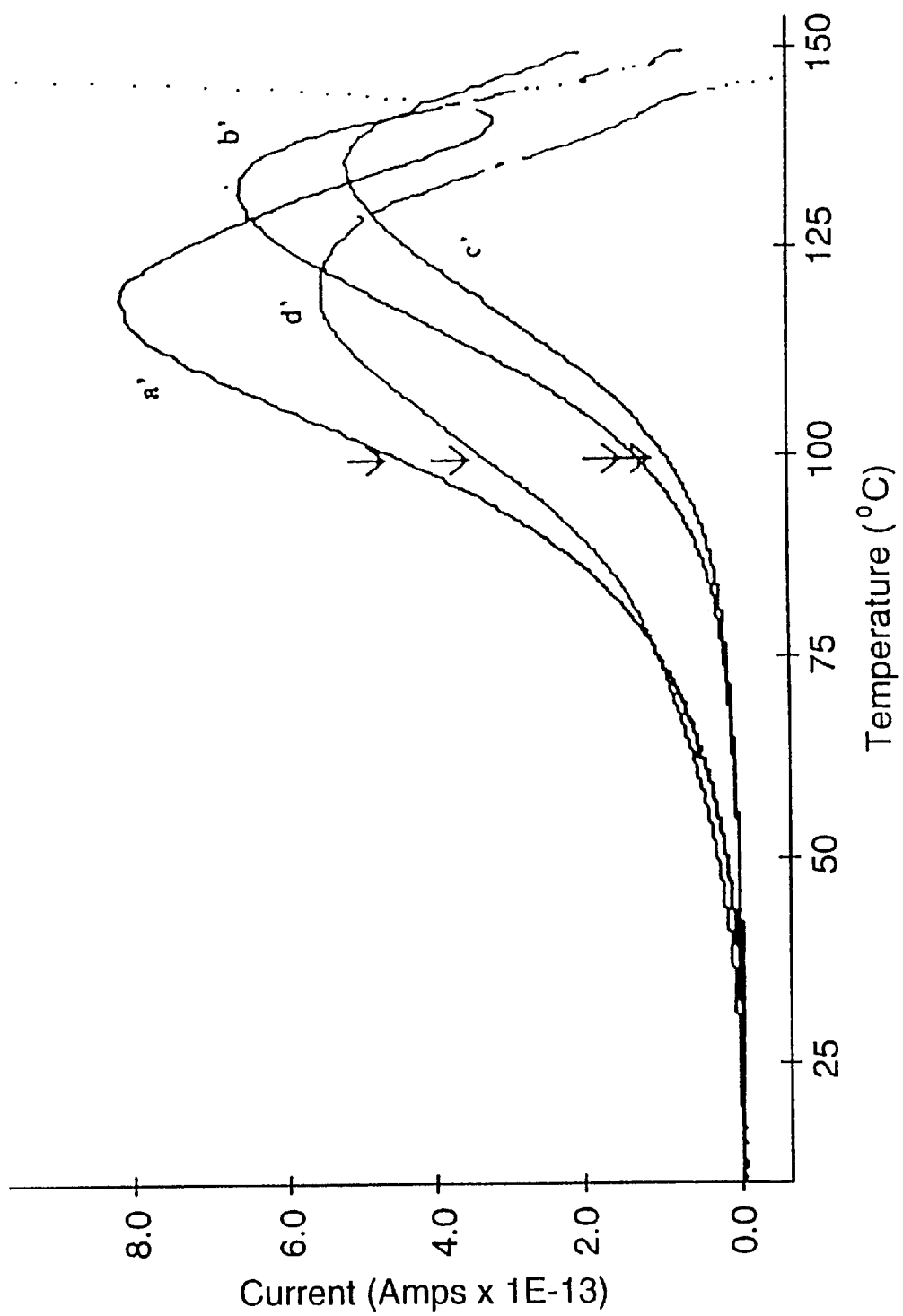
FIG. 16b shows TSDC spectra of annealed and corona charged, unquenched polymer and performance-enhancing additive containing webs that have been poled in an electric field of 2.5 kV/mm at 100° C. for a') 1 minute, b') 5 minutes, c') 10 minutes and d') 15 minutes.

The TSDC spectra in FIG. 16a show peak widths at half height of 18(b), 14(c), and 19(d) for poling times of 5, 10 and 15 minutes respectively. These three peaks have maxima at 140 or 141° C. In comparison, the unquenched comparative examples in FIG. 16b show peak widths at half height of 40(b'), 32(c'), and 34(d') for poling times of 5, 10 and 15 minutes ° C., respectively, and peak maxima at 121, 132 and 136° C., respectively. The superior loading performance of quenched articles is discussed above in relation to DOP load testing.

Thus, FIGS. 16a and 16b and the DOP load testing show the surprising discovery that articles characterized by TSDC peak widths below 30° C. (as measured by Test Procedure 3) correlate with superior oily mist loading performance. These results suggest that articles having a narrower distribution of charge trapping energy levels in the poled state correlate with improved loading performance. Thus, more preferred articles have peak widths of less than 25° C., and still more preferably less than 20° C.

The data also show that, at least for polypropylene-containing articles, there is a correlation between peak position and loading performance with preferred articles having peak positions at about 138 to 142° C.

Examples 22 and 23

Another TSDC data set was acquired for samples identically prepared and tested as described in Examples 20 and 21. Charge densities were calculated for each testing condition as described in TSDC Test Procedure 4 and are tabulated in Table 10 and plotted in FIG. 17.

TABLE 10

Charge Density ($\mu C/m^2$) vs. Poling Time

| Poling Time | Charge Density ($\mu C/m^2$) | | | |
|---|---|---|---|---|
| (minutes) | Quenched | Quenched | Unquenched | Unquenched |
| 1 | 1.55 | 0.94 | 14.2 | 18.4 |
| 5 | 4.47 | 5.5 | 8.23 | 8.97 |
| 10 | 9.05 | 8.0 | 4.18 | 8.81 |
| 15 | 14.5 | 10.57 | 4.08 | 10.8 |

Figure 17:
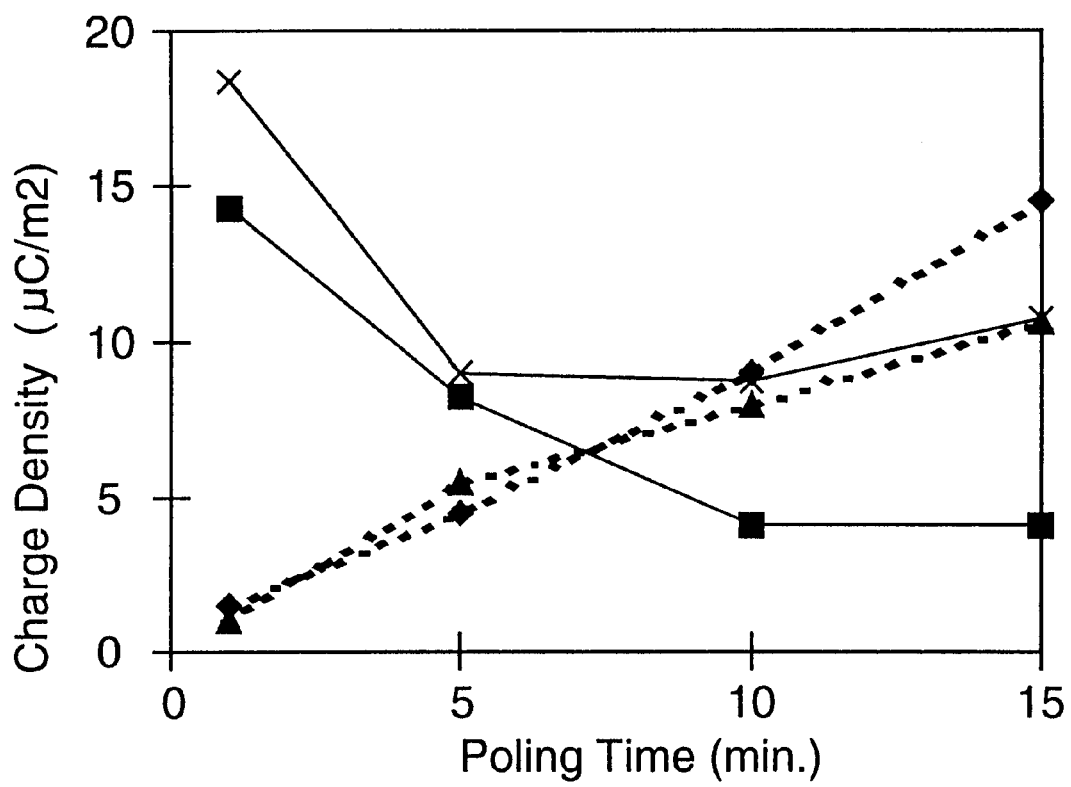
FIG. 17 shows a plot of the charge density vs. poling time for unquenched (solid line) and quenched (dotted line) annealed and corona charged polymer and performance-enhancing additive containing webs.

Comparing the charge densities of the quenched and unquenched articles, as measured by Test Procedure 4, with the corresponding DOP load testing surprisingly shows a correlation between the change in charge density as the article is poled and loading performance. As can be seen in FIG. 17, the quenched (superior loading performance) articles (dotted lines) exhibit increasing charge density as the article is poled for 1 to 10 minutes. In contrast the unquenched (poorer loading performance) articles (solid lines) exhibit decreasing charge density over the same poling period. Thus, a characteristic of preferred articles of the invention is increasing charge density over 1 to 5 and/or 5 to 10 minutes of poling time, as measured by TSDC test procedure 4.

All patents and patent applications mentioned herein are incorporated by reference as if set forth in full.

The invention can have various modifications and alterations, without departing from the spirit and scope thereof. Accordingly, this invention is not to be limited to the above examples but is to be controlled by the limitations set forth in the following claims and any equivalents thereof.

What is claimed:

1. An electret filter comprising a nonwoven web comprising electret fibers that comprise a polymer and performance-enhancing additive, and wherein the filter exhibits an initial detectable DOP penetration of less than 5% and an average Min@Chl of greater than 200 mg DOP as measured by DOP Filter Web Loading Test Procedure 1.

2. The filter of claim 1 having a basis weight of about 10 to 100 g/m².

3. The filter of claim 2 having a thickness of about 0.5 to 2 mm.

4. The filter of claim 1 wherein the performance-enhancing additive is a fluorochemical.

5. The filter of claim 4 wherein the polymer consists essentially of polypropylene.

6. The filter of claim 4 wherein the filter exhibits a pressure drop of less than 12 mm H₂O and an average Min@Chl of greater than 400 mg.

7. The filter of claim 6 wherein the filter consists of melt-blown fibers.

8. The filter of claim 6 wherein the fibers have an effective diameter of about 5 to 30 micrometers.

9. The filter of claim 4 wherein the filter exhibits a Min@Chl of about 800 to 1000 mg DOP.

10. The filter of claim 4 wherein each filter exhibits a Min@Chl of greater than 500 mg DOP as measured by DOP filter web loading test procedure 1.

11. The filter of claim 10 wherein the filter is a respirator.

12. A respirator containing an electret filter comprising a nonwoven web that contains electret fibers that contain a blend of polymer and a performance-enhancing additive; the respirator exhibiting a Min@Chl of greater than 400 mg DOP when testing using the National Institute for Occupational Safety and Health Particulate Filter Penetration Procedure to Test Negative Pressure Respirators Against Liquid Particulates (Procedure APRS-STP-0051-00); and wherein the respirator has an exposed surface area of about 180 cm² or wherein the respirator is tested with the exposed surface area adjusted to be about 180 cm².

13. The respirator of claim 12 exhibiting a Min@Chl of greater than 600 mg DOP when testing using the National Institute for Occupational Safety and Health Particulate Filter Penetration Procedure to Test Negative Pressure Respirators Against Liquid Particulates (Procedure APRS-STP-0051-00).

14. The respirator of claim 12 comprising support structure for mounting the respirator on a person and a mask body comprising a cup-shaped configuration.

15. The respirator of claim 12 exhibiting an initial detectable DOP penetration of less than 5%.

16. The respirator of claim 15 in the form of a molded or folded half-face mask.

17. The respirator of claim 15 exhibiting a pressure drop of less than 13 mm $H_2O$ wherein the performance-enhancing additive is a fluorochemical.

18. The respirator of claim 17 wherein the polymer is polypropylene.

19. The respirator of claim 17 exhibiting a pressure drop of less than 10 mm $H_2O$.

* * * * *

UNITED STATES PATENT AND TRADEMARK OFFICE
CERTIFICATE OF CORRECTION

PATENT NO. : 6,214,094 B1
DATED : April 10, 2001
INVENTOR(S) : Rousseau et al.

Page 1 of 1

It is certified that error appears in the above-identified patent and that said Letters Patent is hereby corrected as shown below:

<u>Column 14,</u>
Line 15, "TSCIRMA" should read as -- TSC/RMA --.

Signed and Sealed this

Twenty-seventh Day of November, 2001

Attest:

NICHOLAS P. GODICI
Attesting Officer  Acting Director of the United States Patent and Trademark Office